United States Patent [19]
Quiros

[11] Patent Number: 5,604,771
[45] Date of Patent: Feb. 18, 1997

[54] SYSTEM AND METHOD FOR TRANSMITTING SOUND AND COMPUTER DATA

[76] Inventor: Robert Quiros, 205 Locust Ave., San Rafael, Calif. 94901

[21] Appl. No.: 317,721

[22] Filed: Oct. 4, 1994

[51] Int. Cl.⁶ .............................. H04L 27/06; H03D 3/24
[52] U.S. Cl. ............................................ 375/326; 375/327
[58] Field of Search ................................. 375/326, 327, 375/324, 340, 329, 261, 279; 329/307, 308, 304

[56] References Cited

U.S. PATENT DOCUMENTS

| | | | |
|---|---|---|---|
| 4,682,117 | 7/1987 | Gibson | 375/326 |
| 5,268,647 | 12/1993 | Ichiyoshi | 375/326 |
| 5,473,637 | 12/1995 | Gardner | 375/326 |

OTHER PUBLICATIONS

"Radish Hits the Road", PC Week, Apr. 4, 1994 (1 page).
Radish Communications Voice View Promotional Document (5 pages).
Scanfone promotional document (3 pages).
Radish Communications Voice View, Press Release, Feb. 17, 1994 (4 pages).
Radish Communications Voice View Application Profile (2 pages).
Melvyl Search results on "Analog Display Services Interface", Jan. 26, 1994 (6 pages).

*Primary Examiner*—Tesfaldet Bocure
*Attorney, Agent, or Firm*—Fenwick & West LLP; A. C. Smith

[57] ABSTRACT

A system transmits computer data by converting and modulating the data into a sound file, allowing the sound file to be stored for later retrieval and transmission. The system includes a sound file creator for modulating input computer data and storing the data. In one embodiment the invention is used with a voice processing system, and can create data prompts, that are either stored or immediately transmitted to a screen telephone. The data prompts can include text and graphics for display on a remote screen telephone the connects to the voice processing system. The sound file creator uses a three layer communications protocol to translate the data into a data format, then modulates and equalizes the data for transmission over a telecommunications line. The data prompts are transmitted in response to a caller's inputs into the voice processing system. The transmitted data is received by a sound file receiver in a screen telephone, or like device, that demodulates the data and outputs to an appropriate display, printer or memory unit. Alternative embodiments of the invention include a facsimile like device for scanning, digitizing and transmitting input documents, and a system for outputting stored data from a memory unit such as a compact disc.

3 Claims, 15 Drawing Sheets

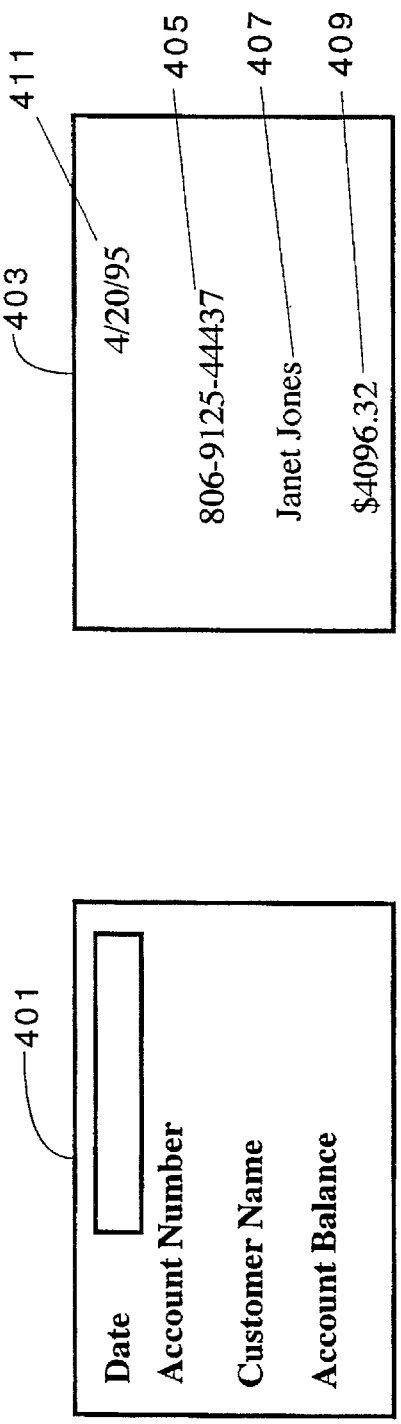
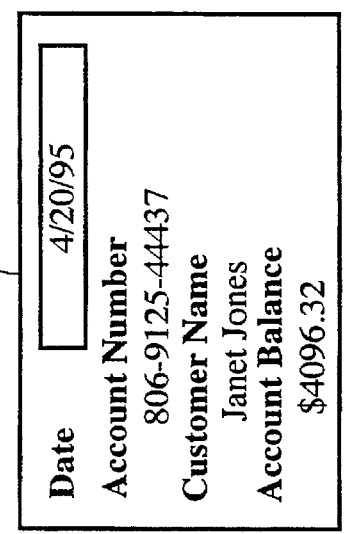
FIGURE 4A
FIGURE 4B
FIGURE 4C

SYSTEM AND METHOD FOR TRANSMITTING SOUND AND COMPUTER DATA

FIELD OF INVENTION

The invention relates generally to systems and methods for transmitting and receiving data for telecommunications, and more particularly, to a system and method for transmitting computer data using sound file formats that are compatible with existing telecommunication devices.

BACKGROUND OF THE INVENTION

There are currently a variety of technologies for the point to point transmission of information, but only relatively few of these are commonly used by consumers to send and receive information. The most common methods in use include voice processing systems, online computer services, screen telephones, and facsimile machines. Voice processing systems, conventionally known as "stored program control systems" or "SPCS's", are telecommunication systems designed to provide information to callers accessing the system over telephone lines. Typically, a voice processing system will automatically answer a telephone call, play a series of recorded "voice prompts" and provide information to the caller as directed by a stored computer program in response to the caller inputs, using either touch-tones, dial pulses or voice recognition. Such voice processing systems are used by an increasing variety and number of information service providers to replace human operators in supplying information to callers. Typical voice processing applications include home banking, customer support, voice mail, or product ordering.

One substantial limitation of most conventional voice processing systems is that they are limited to the delivery of "voice" data to the caller's telephone. That is, such systems can only respond to the caller's inputs with various manipulations of recorded sound files to present the requested data, or provide instructions to the caller. For example, a home banking application will have a "menu" of fixed options, such as current balance, or cleared checks, that are available to a caller. This menu will be created by pre-recording a human speaker stating each of the available options. That recorded sound file is then retrieved by a voice processing application each time the "menu" part of the application is accessed by the caller. Similarly, the system will be able to provide unique combinations of recorded sound files to provide caller specific information.

Thus, a voice processing system for home banking, for example, will typically have prerecorded sound files for each of the digits 0 to 9, and can then aurally provide a caller's bank balance of $1,234.56, for example, by accessing a sound file for each of the following: "one," "thousand," "two," "hundred," "thirty," "four," "dollars," "and," "fifty," "six," "cents." Even though the underlying data in the bank's computer is system is numerical, and would be more easily understood by the caller if visually presented or printed, it can only be provided to the caller by the voice processing system by converting it to voice data.

While some voice processing systems are capable of sending other types of data, such as faxes to the caller's telephone or to a remote telephone, the data thus sent is not compatible with the caller's telephone itself. That is, "sending" a fax to a caller's direct telephone to which no facsimile machine is connected results in the caller hearing an 2! unintelligible series of computer generated tones. Typical voice processing systems are unable to simultaneously send voice data and other types of data, such as computer instructions, over a single telephone line to the caller's telephone or a computing device for decoding of the voice data in connection with the other data, providing the voice data to the telephone and the other data to an appropriate device.

Computer systems are also capable of delivering information to consumers with the use of a modem attached between the computer and a telephone line. With such a system at both the caller's and information provider's locations, a consumer can dial up the information provider, such as an online service, or a bulletin board, and be presented with a textual or graphical menu of choices, rather than hearing the choices played from a recorded sound file. Information supplied by these services can be very rich since it can take full advantage of the display capabilities of the caller's computer. However, information services of this type are limited to the delivery of data to computers, the data being particularly adapted to instructing the caller's computer to receive and display information. These systems cannot easily receive voice or sound data from the caller, nor deliver such data, due to bandwidth limitations. Where conventional voice processing systems handle only sound data, and cannot provide computer-adapted data to the caller, computer systems have the opposite limitation.

One alternative device for providing both voice data and computer-adapted data to consumers are telephones connected to a screen display device, commonly known as screen telephones. Numerous implementations of such devices have been proposed in order to provide the benefits of both voice and visual output. Screen telephones have failed to substantially penetrate the consumer market for a number of reasons. First, such systems typically require expensive telephone devices, the cost of which is well above average cost of a telephone, because of the additional hardware necessary to support the screen display functions. In particular, these devices typically require a number of proprietary integrated circuits, including a separate microprocessor, a modem circuit and other supporting circuitry. These various circuits are needed in order to accommodate the typically complex and computationally intensive operations needed to receive and decode the voice and screen display data.

Second, there is no definitive standard for the operation of screen telephony, and thus each vendor's screen telephone uses a proprietary protocol that limits the screen telephone's use by other vendors or information service providers. While Bell Communications Research has proposed the ADSI (Analog Display Services Interface) protocol, this protocol has yet to be widely used, and was designed primarily to support caller identification, and related functions. Typically then, each brand of screen telephone has proprietary software or hardware specifically designed to receive data from a given service provider, or from the same brand of screen telephone. That is, a given screen telephone is designed for use with a specific information provider's system, and is often incapable of communicating with, and receiving data from, other information service providers. Thus, the screen telephone becomes a special purpose device, losing its value as a general communications device such as a telephone, or general purpose computer, or facsimile machine. Prospective purchasers then are less likely to buy such a screen telephone, since it has a very limited set of uses.

Facsimile machines offer another means of point to point data transmission, but they are more limited than any of the foregoing devices. With a facsimile machine, a user is only able to send and receive printed information, such as text, graphics, photographs, or the like, but typically cannot send or receive any voice data, or other data with the transmission. This limitation makes the facsimile ill-suited for a complete information service that can both receive and output voice and other types of data at the same time.

One of the limitations that all of the foregoing device share is the requirement that they convert, or modulate, the data to be transmitted in real time during actual transmission. Real time modulation requires significant hardware resources, and thereby increases the costs of the transmitting devices. The communications protocols used in real time modulation systems further requires the receiving devices to have a complex chipset in order to demodulate the data. In order to reduce the cost of the transmitting and receiving devices, modulation should be done in software.

Since software based systems do not operate at sufficient speed for real time modulation, it is desirable to provide a system that modulates the data prior to actual transmission and stores it, such that the modulated data can then be retrieved and transmitted. To maintain a low cost receiving device, the communication protocol used in the modulation scheme should not require extensive hardware for implementation, but allow the use of as few integrated circuits as possible.

Accordingly, it is desirable to provide a system, adaptable for use in voice processing systems and the like, that can modulate the data to be transmitted and store that data for later retrieval and transmission. Such a system should preferably transmit both voice and other data types, such as computer instructions and data, to a receiver that is capable of decoding both the sound and data, providing the sound data to an appropriate output device, such as a telephone, and the remaining data, such as computer instructions, graphics, or the like, to an appropriate processor and display or printer. Such a system should preferably be compatible with existing voice processing systems that are limited to transmitting sound files, and accordingly, the system should use only the analog transmitting capabilities of any attached voice or sound processing system to transmit the data. In addition, such a system is preferably adaptable to any device capable of storing and transmitting sound files to a receiving and decoding apparatus, thus providing a generalized architecture for the use of sound and other data types in a variety of existing and future devices.

In addition it is desirable to provide a system, adaptable for use in screen telephony, that allows the design of low-cost screen telephones, particularly through the use of an architecture the requires a minimal number of proprietary circuits for decoding received data. Preferably, a screen telephone, or other device capable of decoding the data, can be implemented using a single digital signal processor executing software for decoding the data. Such a screen telephone should be able to operate with any voice processing system, particularly, any such system that has been adapted to provide both voice and computer-adapted data.

Finally, it is desirable to provide a method of telecommunication that provides for modulation and storage of the data to be transmitted prior to actual transmission, thereby facilitating the transmission of existing data without the need to modulate during the transmission process. Such a method allows for modulation in a software based modulation scheme, reducing the hardware requirements for implementing the method.

SUMMARY OF THE INVENTION

The present invention comprises a system for transmitting data between a transmitter and a receiver using modulated sound files. The sound files contain computer data and are modulated by the transmitter and stored in a storage device for subsequent retrieval and transmission. A receiver is coupled to the transmitter via a communications line, and receives the modulated sound file, and decodes it into a digital format with a decoder, and then demodulates the modulated sound file to recover the data. In one embodiment, the receiver is a screen telephone. The system may further include an output device, such as a printer or display, for outputting the data. The storage device may also include sound data in the form of digitized analog signals, such that the transmitter transmits both the sound data and the modulated sound file. This may be done using time division multiplexing to sequence the sound data and the modulated sound file. In addition, the transmitter may use quadrature amplitude modulation to modulate the sound file. The transmitter may also include a translator that translates a data prompt, such as a menu, screen display, text, or graphic image, into a number of computer executable instructions, and a formatter that formats the instructions into a data frame, which is then modulated by the modulator into a sound file. In another embodiment, the invention comprises a voice processing system with a voice processing apparatus having a storage device for storing voice and computer data, a processor running a voice processing application, a modulator for modulating the computer data, and storing it in the storage device, and a transmitter that transmits that receives the data from the storage device and transmits it to a receiver. The modulated computer data includes a reference signal and a data signal. The receiver includes an signal recovery unit for recovering the reference signal and a demodulator to receive the modulated computer data and demodulate it using the recovered reference signal. The receiver may include a muting device to mute an audio output device in the receiver when the receiver is receiving modulated computer data. The signal recovery unit can include a bandpass filter to recover the reference signal, a phase shifter to adjust the phase the reference signal, and provide the phase adjust reference signal to a phase lock loop for locking onto a phase corrected reference signal. The phase lock loop provides the phase corrected reference signal to a demodulator, which switches from the phase adjusted reference signal to the phase corrected reference signal in order to demodulate the computer data when the phase shift error reaches a predefined limit, indicating that the phase of the reference signal is correct and has been locked onto by the phase lock loop.

These and other aspects of the present invention are more fully described in the following drawings, description of the preferred embodiment, and claims.

BRIEF DESCRIPTION OF THE DRAWINGS

FIGS. 4A, 4B, and 4C are illustrations of data prompts;

DETAILED DESCRIPTION OF THE PREFERRED EMBODIMENT

Figure 1A:
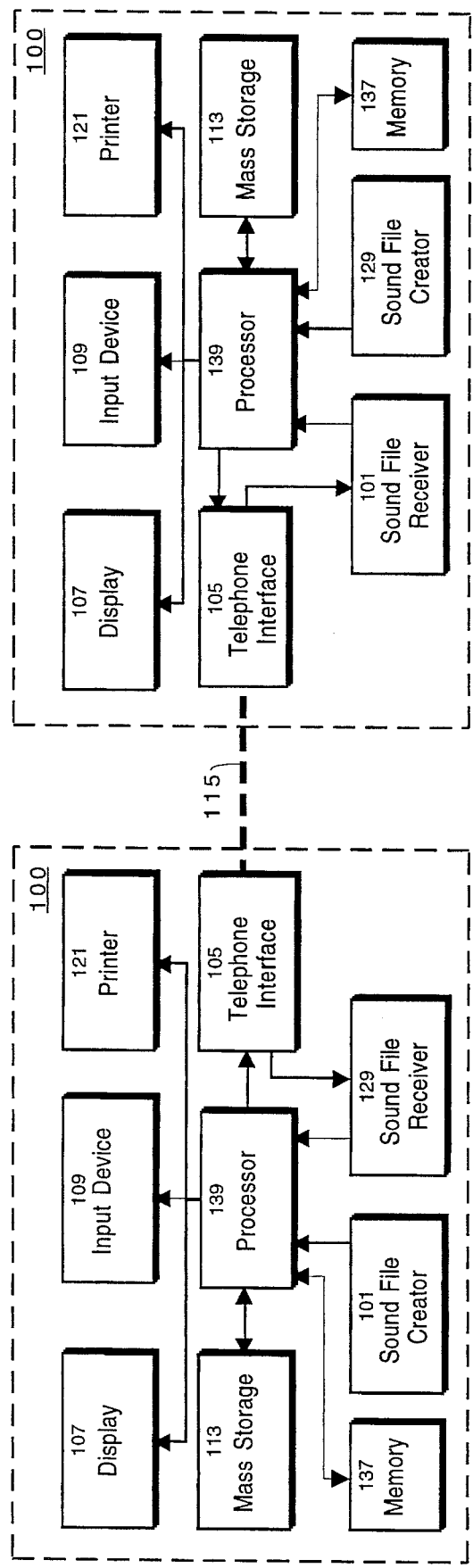
FIG. 1A is block diagram of two interconnected systems for transmitting and receiving computer data in a sound file.

Referring now to FIG. 1A, there is shown an embodiment the present invention, as two interconnected systems 100 for storing and transmitting computer data in a sound file format for use with sound output devices and computer operated devices. Each system 100 comprises a processor 139, or similar device general computing device, connected to a telecommunications line 115, such as a standard telephone line, twisted pair, T1, fiber optics, coaxial, or the like, including cellular or radio based transmission via a telephone interface 105.

The system 100 includes a sound file creator 101 for receiving computer data from a mass storage device 113 or memory 137, modulating the data, and storing the modulated data in the mass storage 113. The sound file creator 101 is controlled by the processor 139. The system 100 is capable of premodulating any computer data, such as documents, text, graphics, audio files, computer code, or the like, prior to actual transmission of the data, and storing the premodulated data. The modulated computer data may then be subsequently transmitted by a processor 139 over the telecommunications lines 115 to the similar system 100 having a sound file receiver 129. The sound file receiver 129 receives and demodulates the computer data. The processor 139 of the receiving system 100 can execute any code or programs included in the demodulated computer data, including outputting the data to a conventional display 107, a printer 121, or storing the data in either an attached mass storage device 113 or a memory unit 137, such as a disk drive, floppy disk, RAM, PCMCIA card, or other non-volatile memory, for storing the received computer data. If systems 100 support computer based telephony, the invention can be used to transmit documents or data between the systems 100 of two callers during a telephone call.

The sound file creator 101 and sound file receiver 129 employ a three layer communications protocol to create and format the computer data. The protocol is designed to minimize the computational requirements of a receiving device, such as the screen telephone 135 in one embodiment, thereby reducing its cost and complexity, while providing high bandwidth for transmitting text, graphics, images, and the like. The protocol is used to transmit the computer data in a sound file format using time division multiplexing. The sound file creator 101 and the sound file receiver 129 is capable of using any existing communications protocol in order to format and modulate data for the purpose of storing and subsequently transmitting the data. The communications protocol used with the sound file receiver 129 and sound file creator 101 offers particular advantages in terms of rapid connection between communicating systems, and control over the manner of transmission.

The detailed operation of the sound file creator 101, the sound file receiver 129, and the three layer communications protocol are described with respect to one of the preferred embodiments of the invention in a voice processing system.

The Voice Processing System

Figure 1B:
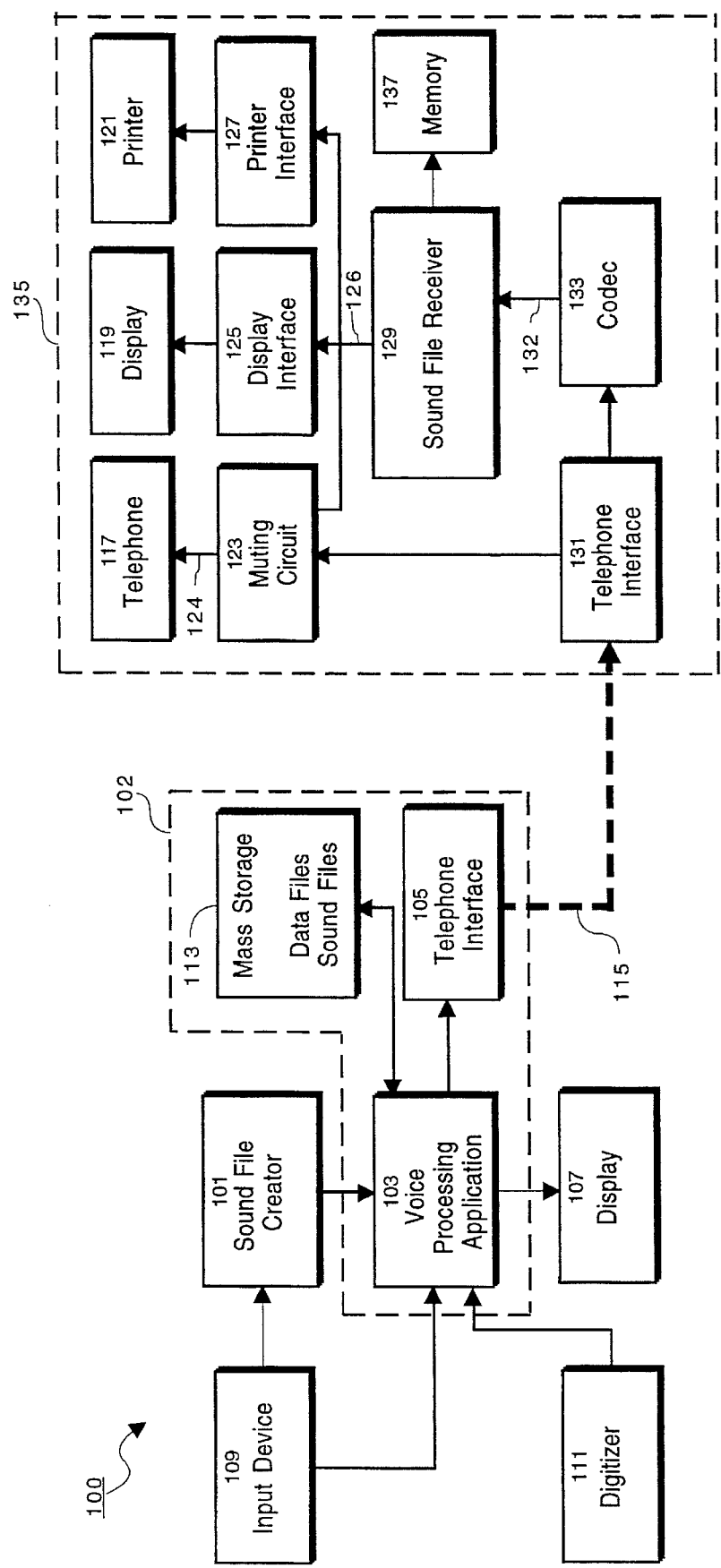
FIG. 1B is a block diagram of one embodiment of the present invention in a voice processing system.

Referring now to FIG. 1B, there is shown one preferred embodiment of the invention in a voice processing system 102. Here the sound file creator 101 is adapted for use with the voice processing system 102 for sending voice and computer data to a screen telephone 135. The voice processing system 102 may be implemented on a personal computer, a workstation, a mainframe computer, or with application specific dedicated hardware, as appropriate. The voice processing system 102 is connected to various peripheral devices, including a mass storage device 113 containing useful databases, an input device 109, and a display 107. The voice processing system 102 is further connected to the telephone line 115 through a telephone interface 105. Through conventional application programming, the voice processing system 102 includes a voice processing application 103 capable of answering an incoming call over the telephone line 115, retrieving and playing a voice prompt, which is a digitized sound file stored in the mass storage device 113, receiving a DTMF (Dual Tone Multifrequency) signal input by the caller, retrieving information from the databases in the mass storage device 113 according to the input signal, and transmitting that information back to the caller. The information retrieved may be either another voice prompt, in a conventional manner, or computer data processed according to the communications protocol described herein.

Typically, the voice prompts are created "off-line," that is prior to the operation of the voice processing system 102. The voice prompts may be conventionally recorded using an input device 109, such as a microphone, and digitized with a digitizer 111 to convert the recorded voice prompts from an analog signal into digital data, that is then stored in the sound file database in the mass storage device 113. The voice prompts may be edited to erase unnecessary silence, and the like. Once digitized and edited, voice prompt files may be compressed using some variant of ADPCM (Adaptive Differential Pulse Code Modulation) to save on storage space in the mass storage device 113. This compression degrades the recorded sound file only slightly, typically introducing a small amount of extra noise. The voice prompts are then integrated into a processing routine to create the resulting voice processing application 103.

In addition to the use of voice prompts, the voice processing system 102 can transmit computer data in the form of text, graphic images, menus, pictures, and the like ("data prompts"). The data prompts are created using the sound file creator 101, and then processed according to the communications protocol to produce a sound file that contains formatted and modulated analog sound data. Additionally, the data prompts and resulting sound files can be created from other types of data, such as numerical data, computer code, text files, and the like. These sound files can be transmitted by the voice processing system 102 to the screen telephone 135 for decoding, and display or printing, as appropriate in response to a caller's inputs. The screen telephone 135, using a sound file receiver 129 operating in accordance with the communications protocol, decodes the sound file into its voice and data components, sending the voice prompts to the telephone handset 117 and the data prompts to the appropriate output device, such as a display 119 or a printer 121.

Figure 2:
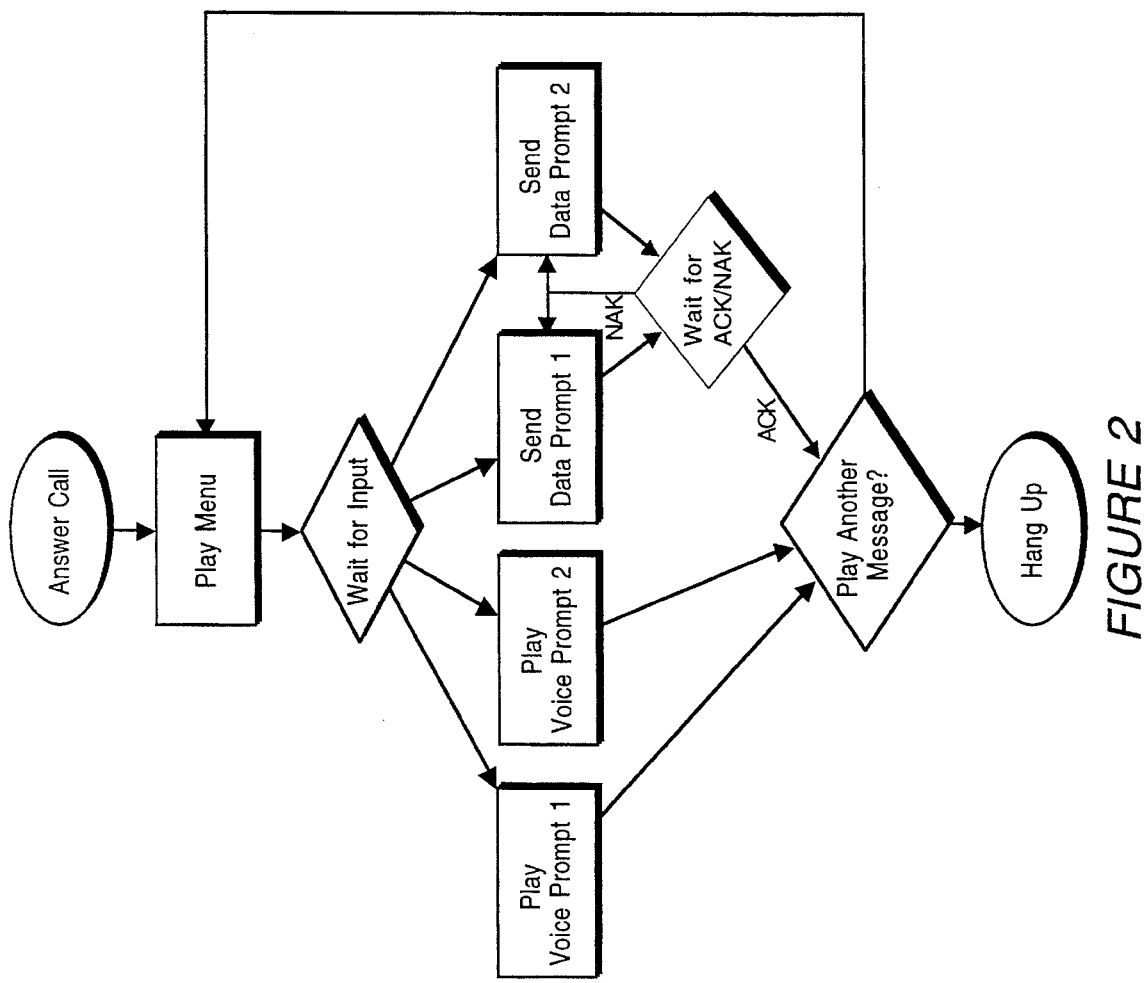
FIG. 2 is an example of a flowchart of a voice processing system's processing routines.

The voice processing system 102 is coupled to an input device, 109 such as a keyboard, mouse, stylus, or the like, for inputting commands and graphic elements to the voice processing system 102. In conjunction with the display 107, a system administrator can design the voice processing application 103, either graphically by constructing a flowchart of the processing routines used therein, or through the use of a high level programming language, such as C or C++. The voice processing application 103 specifies various sound files or data files for transmitting to a caller's screen telephone 135 in response to appropriate inputs. FIG. 2 shows an example of a graphically designed processing routine for sending voice prompts to caller in response to the caller's inputs. At each place in the flowchart where a voice prompt or data prompt is to be transmitted to the caller's screen telephone 135, the processing routine contains a pointer to a sound file which contains the appropriate prompt.

The databases stored in the mass storage device 113 and connected to the voice processing system 102 include both sound files and various computer data files. The sound files can include conventional digitized voice files, such as those described above, for providing voice prompts to callers. In addition, the sound files can include files created by the sound file creator 101, comprising data prompts or other computer data from the data files. In the preferred embodiment, the sound files, including both the voice prompts and the data prompts, are digitized using an 8 kHz sampling rate, in accordance with telephone industry practice.

The Screen Telephone

Connected to the voice processing system 102 over the telephone line 115 is the screen telephone 135. The screen telephone 135 includes a sound file receiver 129 that outputs the voice data through a telephone handset 117 and outputs the computer data on the screen display 119 of the screen telephone, or to an attached printer 121, or other output devices through the appropriate device drivers 125,127. The screen telephone is further coupled to a memory unit 137.

The screen telephone 135 includes a screen display 119, which is preferably an LCD display, or cathode ray tube display, and is driven by appropriate display drivers 125 for displaying graphics, text, and the like from the transmitted data received from the voice processing system 102. The screen display 119 may be physically integrated with the telephone 117, or may be a separate unit connected with a conventional telephone line, or an equivalent connection.

Also connected to the screen telephone 135 is a printer 121 for printing information received from the voice processing system 102. This printer 121 can be of any variety of conventional types, including ink jet, laser, dot matrix, or the like. The printer 121 can be used, for example, to print coupons, receipts, or advertisements from vendors, or more generally, to print any type of information, such as text, graphics, and the like. For example, a vendor of consumer goods or service may use a voice processing system 102 to supply discount coupons or product information to a caller. The caller may access the vendor's voice processing system 102, select a desired product or service from a menu displayed on the screen telephone display 119, and then receive a coupon or product literature for the product through the printer 121. In the preferred embodiment, the printer 121 is integrated into the screen telephone 135. However, in alternate embodiments, such as where a full size printer is used, in order to print business documents, letters, and the like, the printer 121 may be separate from the screen telephone and connected through conventional means.

The screen telephone 135 includes a telephone interface 131 for connecting to the telephone line 115. The voice prompts and data prompts from the voice processing system 102 are received as a modulated signal by the telephone interface 131, which then passes the signal to both a muting circuit 123 and to an analog-to-digital converter, or codec 133. The codec 133 decodes and converts the analog signal into a digital signal for further processing by the sound file receiver 129.

The sound file receiver 129 is preferably implemented as a digital signal processor executing specific software for receiving and demodulating the received data, decoding the data, and processing the data as appropriate. Generally, the sound file receiver 129 performs the following tasks: detect the start of data transmission, lock onto a carrier reference, match the carrier phase, synchronize a clock, demodulate the transmitted data, decode the data into display commands, and print commands or the like, and display or print the appropriate text and graphics. The sound file receiver 129 is included in either the screen telephone 135, where this is an integrated device, or in the same unit as the screen display 119 where the screen display 119 is not physically integrated with the telephone 117. In alternate embodiments of the invention, the sound file receiver 129 may implemented with a standalone printer 121 for printing received data.

The muting circuit 123 is used to mute the output to the telephone 117 while a data prompt is being received by the screen telephone 135. Where the screen telephone 135 is integrated with the telephone 117 in a single chassis, the muting circuit 123 is directly coupled to the sound file receiver 129, and comprises a switch that opens the circuit to the speaker of the telephone 117, or alternatively, decreases the gain of an amplifier for the speaker. Where the screen telephone 135 is in a separate chassis from the telephone 117, and is coupled thereto through a standard two-wire telephone line, the muting circuit 135 comprises a relay controlled by the sound file receiver 129; when the sound file receiver 129 detects a data prompt, it triggers the relay to open.

When the telephone 117 is off-hook, the sound file receiver 129 enters a standby state. While in the standby state the sound file receiver 129 looks for the specific format of a data prompt, as further described below. When a call is placed to a compatible voice processing system 102 and a data prompt is detected, the sound file receiver 129 becomes active and demodulates and displays the data prompt. Since the voice processing system 102 alternates between sending data prompts and voice prompts, if the data prompt were to pass to the telephone handset 117 without being muted it would sound like the loud whine of a facsimile machine. Thus, when the sound file receiver 129 detects the start of the data prompt it signals the muting circuit 123 to decrease the handset volume in the telephone 117.

Before the details of the sound file receiver 129 are described, it is beneficial to discuss the design and operation of the sound file creator 101, and the communications protocol that affords for the transmission of voice and data prompts in a common native sound file format.

The Sound File Creator

Figure 3:
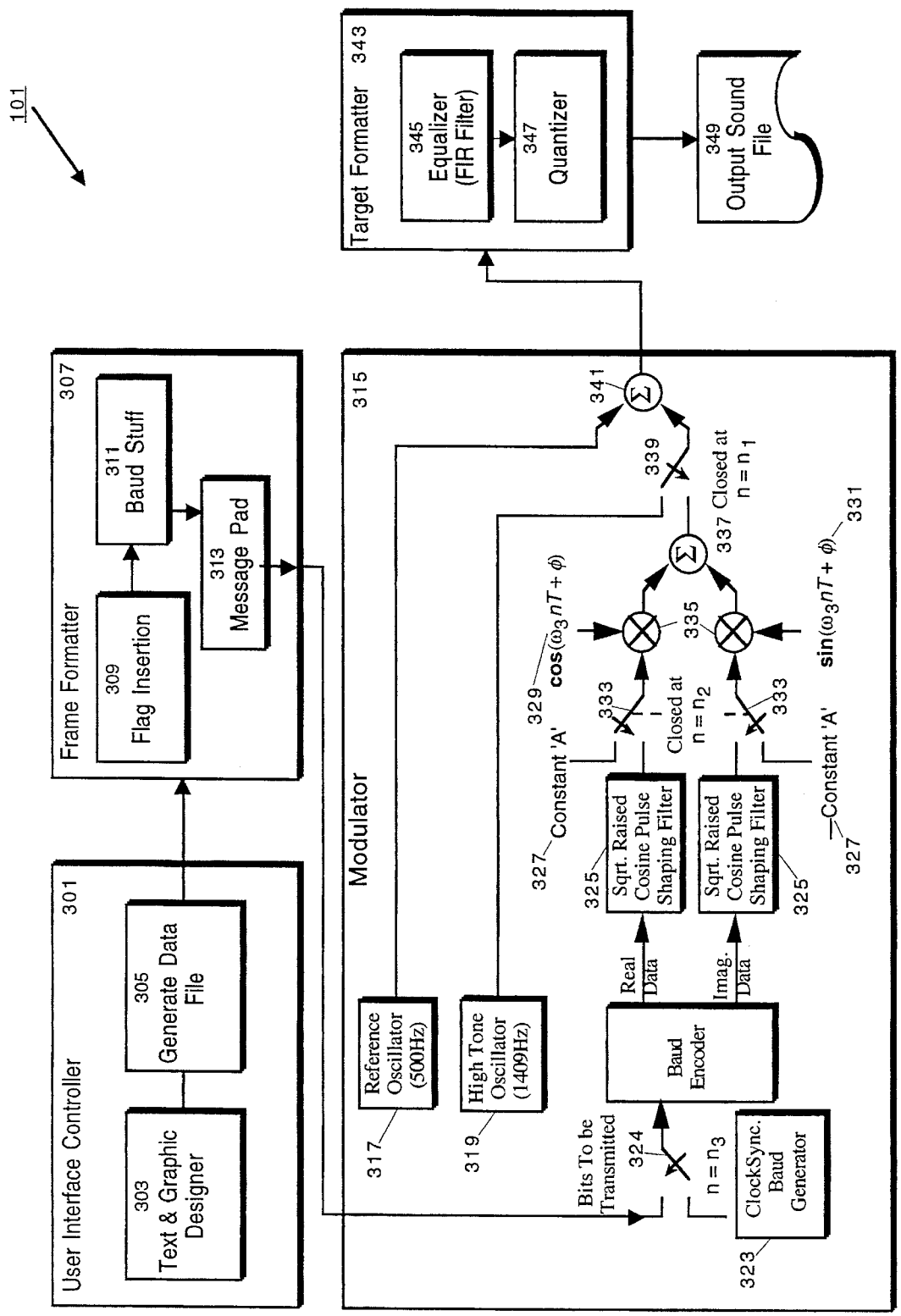
FIG. 3 is a block diagram of the sound file creator.

Referring now to FIG. 3, there is shown a block diagram of the sound file creator 101. The sound file creator 101 can be used with the voice processing system 102 or in other applications for the purpose of modulating and storing computer data. The sound file creator 101 performs a number of processing functions in order to create a data prompt and convert it into a signal format that can be transmitted over a telephone line 115 for decoding by a sound file receiver 129 in a screen telephone 135, or other compatible device. The elements of the sound file creator 101 can implement the different layers of the communications protocol used with the invention. Those three layers are the physical layer, defining the modulation and transmission of the signal, the datalink layer, defining structure of the data being transmitted, and the information layer, defining the various commands and data that are actually transmitted by the system. Alternatively, the sound file creator 101 can be used with other communications protocols.

User Interface Controller

The sound file creator 101 includes a user interface controller 301 that allows a system administrator to construct the data prompts, such as various graphic forms, arid menus, for transmission to a printer 121, display 119, screen telephone 135 or other device. The user interface controller 301 implements the information, or third layer of the communications protocol to create the computer data, including executable instructions and data for transmission to an appropriate receiving device, such as a screen telephone 135. The system administrator draws out, on the display 107, the layout of the data prompt, including imported graphics, pictures, text, and the like. The user interface controller 301 then converts this layout into a list of commands or computer instructions, for example, "display the following bit mapped graphic at location (2,10)," or "display the following text on line 5" in the appropriate computer language. These commands are encoded, into a binary header with a data sequence.

FIGS. 4A–C show examples of the visual aspect of the data prompts created with the user interface controller. In FIG. 4A, a static data prompt has been graphically created using conventional drawing tools. When used in a voice processing system 102, the static data prompts are predefined and do not change during the operation of the voice processing system 102. Static data prompts can thus be used to provide standard information displays, menus, forms, and the like. Static data prompts may also be created using conventional word processing, spreadsheet, CAD, or other types of software application. Static data prompts also be used to create coupons, advertisements, letters, or any other printable or displayable type of information. When the sound file creator 101 is used with a voice processing system 102, the static data prompts can be created by the administrator when the voice processing application 103 is created, or during maintenance of the voice processing system 102. Static data prompts are well suited to the large variety of applications that deliver the same information to all callers, such as news services, stock quotations, advertisements, or the like. When used in embodiments other than a voice processing system 102, the static data prompts represent any type of computer data that can be processed, output, displayed or printed. Thus in other embodiments, the user interface controller 301 is capable of importing any type of computer data that can be created in the system, and providing this data to the other components of the sound file creator 101 for processing. Thus, the static data prompts can be used to represent text, graphic, audio, source or object code, spreadsheets, and the like. The sound file creator 101 will format and modulate the data, and then store it in the mass storage device 113 for later transmission.

In a voice processing system 102, used for example in a banking application, there is typically a need to provide each caller with specific information pertinent to the caller. Accordingly, the sound file creator 101 provides for a dynamic data prompt 403, using caller specific information needs to be created. FIG. 4B shows an example of a dynamic data prompt 403. The data prompt is dynamic because it depends on the information that is being retrieved from the data files in response to the caller's inputs to the voice processing system 102. Thus the dynamic data prompt 403 in the example of FIG. 4B includes the caller's account number 405, name 407, account balance 409, and the current date 411. The sound file creator 101 is capable of creating these dynamic data prompts in real time during operation of the voice processing system 102 in response to caller inputs.

The ability of the sound file creator 101 to predmodulate and store static data prompts (or other types of data) prior to transmission is that an existing stored data prompt can be transmitted in combination with a dynamically created data prompt that is created and modulated in real time. This allows the receiving device, such as screen telephone 135, or any processor 137 operating a display 107, to display the combination of the static and dynamic data prompts to the user. FIG. 4C shows one simple example of how the data prompts of FIGS. 4A and 4B would be combined by a receiving device for display on the caller's screen telephone 135, or other output device. Other more elaborate interactions between static and dynamic data prompts are possible. Where the sound file creator 101 is used in embodiments other than a voice processing system 102, the sound file creator can create the dynamic data prompts using any computer data available in the system, and process it in real time.

For example, where the sound file creator is used in the configuration shown in FIG. 1A, the transmitting system can send the receiving system stored data comprising a spreadsheet, whereon the processor 139 in receiving system displays the spreadsheet on the display 107, and then can update the spreadsheet using dynamic data prompts to show data generated in real time.

The data prompts created by the user interface controller 301, are provided to a frame formatter 307 for further processing.

Frame Formatter

Figure 5A:
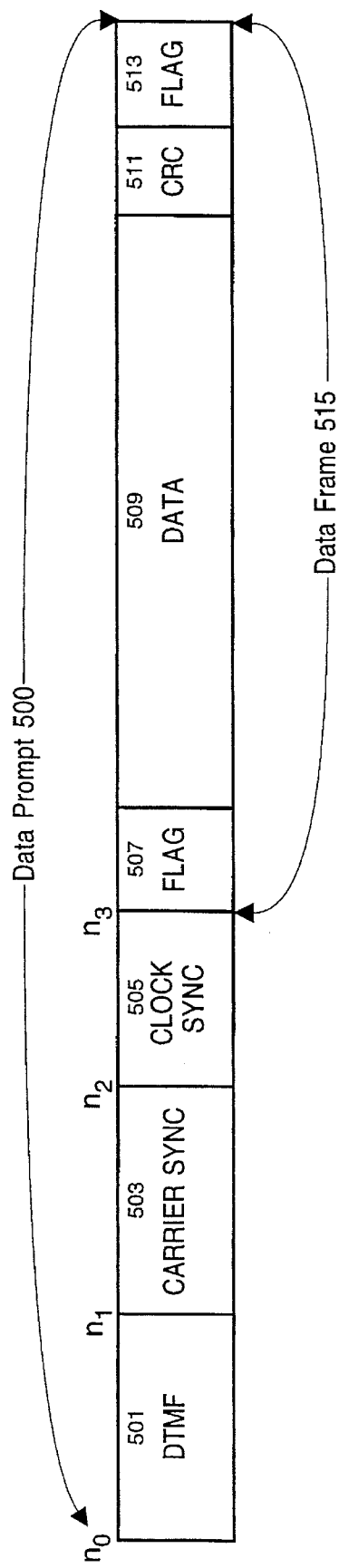
FIG. 5A is the data structure of a data prompt.

The frame formatter 307 is used to implement the second layer of the communications protocol of the present invention. The frame formatter 307 takes in the raw binary computer commands that define a data prompt from the user interface controller 301, and formats the data prompt into a data frame 515 that can be identified by the screen telephone 135 when it is transmitted from the voice processing system 102. FIG. 5A shows the format of a data frame 515 created by the frame formatter 307, as part of an encoded data prompt 500. The data frame 515 contains the data sequence of the data prompt itself, as modulated by the modulator 315, described below. The preferred embodiment of the frame formatter 307 uses a modification of the HDLC data frame format. In HDLC data flames are delimited by flags that cannot occur in the data being transmitted. In the communications protocol used with the present invention, instead of a flag being a sequence of bits (as in HDLC) it is chosen to be a sequence of symbols (bauds) that represents four bits. In the present implementation the flag is the hexadecimal sequence C1A, but any sequence could be used. Accordingly, the frame formatter 307 includes a flag inserter 309 that adds a beginning flag 507 and an ending flag 513 to the data prompt 500. At the end of the data frame 515 a 16 or 32 bit CRC 511 is included for error detection. In order that the flag sequence never occurs in the data itself, the frame formatter 307 includes a baud stuffer 311 that searches through the data sequence of the prompt and if it discovers a sequence matching a flag, inserts a baud to break up the sequence.

The process of inserting a baud can lead to an odd number of bits in the data prompt 500. Because the complexity of the sound file receiver 129 can be reduced when the data frame 515 has an integer number of bytes, the frame formatter 307 includes a function 313 that pads the message with trailing zeros to ensure an even number of bytes are transmitted. The use of symbol/byte orientation here is purely to simplify the receiver decoding.

The frame format imposed by the frame formatter 307 is dependent on the data link layer specification of the communications protocol used by the sound file creator 101 and receiver 129. In alternate embodiment using a different communications protocol, the precise frame format, flags, and the like would be different.

The Modulator

In the preferred embodiment of the sound file creator 101, the modulator 315 implements the first, or physical, layer of the communications protocol. The modulator 315 is used create the signal containing the data prompt 500 that will be transmitted to the screen telephone 135. The modulator 315 can be used to modulate static data prompts, or any other data that exists in the system, such that the modulated data is then stored in the mass storage 113 for subsequent transmission. Additionally, the modulator 315 can modulate data prompts or other data in real time, for immediate transmission.

In order to execute in real time, the modulator 315 is designed to run on a dedicated microprocessor, preferably having a hardware multiplier, such as a DSP chip, and executing software routines that implement the various elements of the modulator 315. The actual design of the signal format created by the modulator 315 is very strongly coupled with the design of the sound file receiver 129 in the receiving device, such as a screen telephone 135.

In order to transmit data between the transmitting system and the receiving system, a communications protocol is necessary to define the signal format. A principal goal of such a communications protocol is to reduce the complexity of the sound file receiver 129 while maintaining high transmission speed. The communications protocol used by the preferred embodiment of the present invention satisfies this constraint. In addition, since one of the primary benefits of the invention is that it allows a voice processing system 102 to send graphics or text, as well as voice data, to a screen telephone 135 or other receiving device having a minimal number of special purpose IC's, the protocol does not require the screen telephone 135 to have a significant amount of processing power or complexity. Because the data transmitted to the screen telephone 135 can take many forms, including text, graphics, or pictures, the protocol provides for a reasonably high data transmission bandwidth.

The sound file creator 101 can be used to transmit both computer data and voice on a single communications line 115, thereby reducing the need for either dedicated data lines and voice lines, or for complex packet-based systems. The protocol transmits data in bursts during periods when no voice or sound data is on the line. This enables a voice processing system 102, or any device using the communications protocol, to provide voice prompts to the caller with information and options, and then to provide computer data in response to the caller's inputs. Transmission in bursts requires the communications protocol to enable rapid recovery of carrier and clock signals to synchronize the transmitting and receiving systems.

The second layer of the communications protocol is used to format the data prompt into the appropriate data frame for decoding by a receiving device. The first layer of the communications protocol used in the preferred embodiment of the present invention is based on quadrature amplitude modulation (QAM), which uses both the amplitude and phase characteristics of a carrier signal to convey information. QAM sends data encoded in "constellation point" changes. The modulation of these constellation points (X, Y) is formed by the equation:

$$X\cos(\omega t + \phi) + Y\sin(\omega t + \phi_c) \qquad \text{Eq. 1}$$

where $\omega$ is the carrier frequency which must be recovered at the sound file receiver 129. A more detailed discussion of the basics of QAM can be found in Gibson, Jerry *Principles of Digital and Analog Communications,* 2nd Ed. Macmillan, N.Y., 1993, ISBN 0-02-341860-5. Because QAM uses both the phase and frequency components of a signal, in a QAM scheme one symbol can represent more than one bit of information. In Eq. 1, while X and Y may take on any value, they are typically assigned specific points. The number of such points in the QAM plane gives the number of bits per symbol. Using 4 points provides 2 bits per symbol, and with 128 points, 7 bits per symbol are possible. The communications protocol of the present invention does not mandate any particular number of points, however, the preferred embodiment of the sound file creator 101 uses 16 levels with 4 bits per symbol.

Figure 5B:
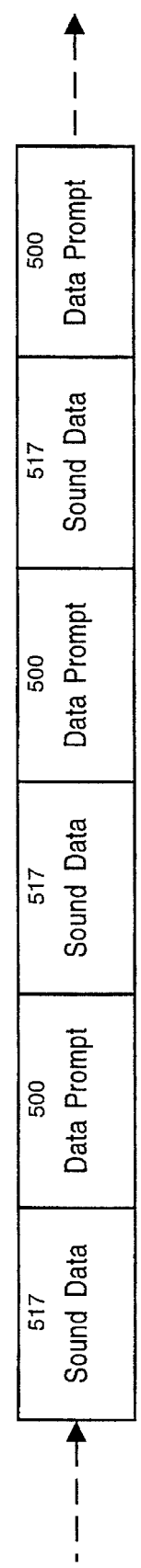
FIG. 5B is a sample signal comprised of data prompts and voice prompts.

Referring still to FIG. 5, the signal format for the data prompt 500 is divided into four sections: start DTMF, carrier sync, clock sync, and data frame 515, which has already been discussed. The only constant throughout is the reference frequency, which in the preferred embodiment is 500 Hz, the selection of which is described below. The transmitted reference frequency does not change in magnitude or phase throughout the entire data prompt. The modulator 315 may use a different signal format where other modulation schemes are employed.

Start DTMF: One of the requirements for a combined voice and data communications protocol is the discrimination between a voice prompt and a data prompt 500. While the human ear can certainly tell the difference between voice on the telephone line and the whine of a fax machine or other device, the process is much more difficult for electronics and software. The sound file receiver 129 needs to have a signal that it can quickly identify as signifying the start of a data prompt 500.

To signal the sound file receiver 129 that a data prompt 500 is being sent, a DTMF 501 of short duration is sent that will toggle the sound file receiver 129 into a receiving mode. In order to give the sound file receiver 129 a slight head start in demodulating the signal, one of the frequencies in the DTMF 501 is selected to be a reference frequency.

In the current implementation the start DTMF 501 consists of a 500 Hz reference summed 341 with a 1409 Hz signal. The reference frequency is produced by a reference oscillator 317, and the high tone produced by its own oscillator 319. The limited power available for transmission must be split between the reference and the data signals. The communication protocol uses the V.22 specification for guard tones, 0.45:0.55::reference:data. Accordingly, the reference is 6 dB below the 1409 Hz tone - 45% of power in the reference and 55% in the high tone. The exact ratio is not critical so long as the two are roughly equal in magnitude and the summed signal can be represented digitally without causing the composite signal to be clipped. AT&T specifications state that the minimum duration of a DTMF for positive detection is 50 ms. The preferred embodiment of the present invention uses a 100 ms duration DTMF 501. In FIG. 5, $n_0$ represents the beginning of the DTMF 501, and $n_1$ represents the end. At the end of the DTMF 501 a switch 339 closes, removing the high tone, and allowing for transmission of the carrier sync 503, clock sync 505 and data frame 5 15. The reference oscillator 317 remains coupled to a summer 347 in order to add the reference frequency to the remaining signal portions.

Carrier Sync: In order for the sound file receiver 129 to demodulate a QAM data stream the sound file receiver 129 needs to recreate or "recover" the exact frequency and phase of the modulating carrier. Typically, V.32 computer modems do not send a separate signal down the line for carrier recovery. Carrier recovery is normally accomplished by tuning an oscillator such that a predetermined data sequence is received correctly. This recovery scheme is appropriate for computer communications because the up front synchronization time is short, around 15 to 20 seconds, compared with the length of time the modems will be connected, which is often on the order of many minutes. This scheme also leads to a most efficient use of the limited bandwidth available for transmission.

Any communications protocol used by the present invention preferably has the transmitting system transmit in bursts, when the system is not transmitting voice or similar data. Because no data reception can occur in a QAM system until the sound file receiver 129 has synchronized on the carrier, a fast synchronization scheme is required that does not impose the typical 15–20 seconds of delay for carrier recovery. Such a delay for the transmission of each data prompt would be unacceptable. While there exist numerous schemes for fast carrier recovery in QAM systems, most of the schemes that do not rely on a transmitted reference are extraordinarily complex and would require a very powerful and hence expensive DSP chip. This makes them unsuitable for use in a product which must be produced cheaply for the consumer market.

Accordingly, then, with the communications protocol used in the preferred embodiment, a carrier reference 503 is transmitted along with the modulated data. Carrier acquisition by the sound file receiver 129 can be made faster this way because an error signal (the difference between the actual carrier frequency and the "recovered" carrier frequency) can be updated once per sample versus once per baud, where the baud rate is always less than the sample rate. The faster the rate that the recovered carrier frequency is updated, the faster the carrier recovery can be achieved.

The use of a separate carrier reference alone is not enough to guarantee a fast acquisition time. The characteristics of a phase locked loop that is used to lock onto the transmitted reference are crucial. The preferred embodiment of the sound file receiver 129 uses a fourth order digital phase locked loop with a modulated gain characteristic that can lock onto a reference signal in approximately 100 samples. This phase locked loop is discussed in more detail with respect to FIG. 7. One aspect of this phase locked loop, which has relevance to the bandwidth allocation issue, is that the phase locked loop performs best, has the fastest acquisition time and lowest noise on output, when the incoming reference frequency is an even divisor of the sampling frequency. More specifically, it has been determined that the phase locked loop works best when the carrier frequency is ¼ of the sample rate.

However, because random phase shifts may occur over the telephone line 115, the transmitted reference frequency from the reference oscillator 317 alone cannot be used by the sound file receiver 129 to recover the correct phase. In order to recover the phase $\phi$ quickly a constant signal $$A[\cos(\omega t+\phi)-\sin(\omega t+\phi)] \qquad \text{Eq. 2}$$

is added 337 to the reference frequency and sent as the carrier sync 503 from time $n_1$ to $n_2$. The amplitude A is chosen so that there is no discontinuity between carrier sync 503 and the clock sync 505 portions of the data prompt 500. $\omega$ is the nominal carrier frequency. The phase can then be recovered by adjusting the recovered reference phase such that the sum of the in-phase and quadrature data streams is zero. Phase and frequency recovery are not simultaneous in the present implementation of the sound file receiver 129. Thus this portion of the data prompt 500 lasts for about 100 ms.

The selection of the carrier frequency is based on the bandwidth available for transmitting the voice and data prompts, and on the allocation of that bandwidth. The sound file creator 101 creates sound files that can be accommodated by the bandwidth of conventional analog telephone lines. Typical analog telephone lines can pass frequencies in the range between 300 and 3300 hertz. This provides a usable bandwidth of about 3000 Hz. In a QAM scheme the range of frequencies required to transmit data that changes at C Hz symbol rate, where one symbol can represent more than 1 bit of data, modulated on a carrier of D Hz is between (D−gC) and (D+gC), where g is a coefficient less than 1 (typically about 0.8) used to account for a possible reduction in required bandwidth due to special pulse shaping filters. For example, for a symbol rate of 1000 Hz, and a carrier frequency of 2000 Hz, where g is 0.8 then all the frequencies between 1200 and 2800 Hz are needed to transmit this data. A V.32 modem uses an 1800 Hz carrier and a baud (symbol) rate of 2400 Hz. In order to fit this into the available bandwidth g must be approximately 0.6.

As discussed above, for fast and computationally simple carrier recovery, a carrier reference is transmitted along with the modulated data. Since this reference is to be easily separated from the data it is desirable that it be sent in a separate frequency band that does not overlap with the data bandwidth. A "guard band" is used between the edge of the band required for data and the transmitted carrier reference in order to allow relatively low order bandpass filters in the sound file receiver 135.

The foregoing analysis affords an allocation of the available bandwidth that maximizes the system's efficiency, based on the following equations:

$$B=nR \qquad \text{Eq. 3}$$

$$C=mR \qquad \text{Eq. 4}$$

$$C + gB \leq 3300 \qquad \text{Eq. 5}$$

$$300 \leq R \leq (C - gB) - G \qquad \text{Eq. 6}$$

where B=symbol rate, C=carrier frequency, R=base reference, g=reduction due to pulse shaping, G=required guard band, n and m are integers. Accordingly, since the sample rate is 8000 Hz, which is typically used for digitized sound files, and the phase locked loop works best when C is one-quarter of the sample rate, then C=2000 Hz. Then, since B and C should be integer multiples of R, R=500 Hz, and B can be either 1000 or 2000 depending on G and g.

In the preferred embodiment B=2000. With this value, and with g=0.6, the upper and lower data limits are 2000±1200 leaving a guard band G of 300 Hz (800–500). This allocation is sufficient for the purposes of transmitting the sound files containing both the voice and data prompts. Alternatively, an acceptable set of parameters includes B=1000 with a less stringent requirement of g=1. This leaves a guard band of 500 Hz.

The higher the baud rate the faster data can be sent. If the sound file receiver 129 were adapted to a slightly different sampling rate then the baud rate could be increased. If the sample rate were 9600 Hz a reasonable value for R would be 600 (9600/16). However, then only n=2, m=3 will work given the other constraints, resulting in a guard band G=0.

Clock Sync: Another issue related to carrier recovery is clock recovery. The "clock" is the reference which tells the sound file receiver 129 when to sample a symbol, and thus has the same frequency as the symbol rate. In the same way that the carrier frequency and phase are recovered, the clock frequency and phase should also be recovered. One method to recover a clock signal is by making the carrier frequency and the clock (symbol) frequency equal. Then only one frequency (but two distinct phases) needs to be recovered. In the preferred embodiment, the clock and carrier frequencies are integer multiples of the same base frequency—for example 2 and 3 times 600 Hz giving a 1200 Hz symbol rate on an 1800 Hz carrier.

Accordingly, when the reference frequency is transmitted, it contains the clock and the carrier information, and need only be multiplied by the correct values of n and m. Therefore the clock frequency has been established in the carrier sync 503 portion of the data prompt 500 but its phase has not. After the carrier sync 503 portion has been transmitted, the switches 333 close, and the clock sync 505 portion is transmitted to recover the clock phase. This clock sync 505 portion of the data prompt 500, between $n_2$ and $n_3$, contains a baud pattern produced by the baud generator 323, which allows the sound file receiver 129 to determine the correct baud center (sampling point) and adjust the clock phase accordingly. The baud pattern has sufficient regularity to allow the sound file receiver 129 to detect the baud clock phase, and preferably does not contain a component at the same frequency as the reference frequency. At $n_3$ the sound file receiver 129 will have recovered the carrier and clock frequencies with the appropriate phases. The switch 324 closes, and allows the data frame 515 portion of the data prompt 500 from the frame formatter 307 to be transmitted.

The modulator 315 works in discrete time, with the continuous variable t in Eq. 1 replaced by nT where n is an integer which increments at each sampling instant and T is the sampling period in seconds. For the data prompt 500 preamble, comprising the DTMF 501, the carrier sync 503, and the clock sync 505, the modulator 315 generates floating point samples (S(nT)) represented by the following equations (Eq. 7–9):

$$\text{Envelope}(nT) \cdot (.45 \cdot \sin(\omega_1 nT) + \qquad \text{Eq. 7}$$

$$.55 \cdot \sin(\omega_2 nT)) \qquad 0 \leq n \leq 1000(=n_1)$$

$$\text{Envelope}(nT) = 1 - \left(\frac{1}{1-p}\right) \qquad \text{Eq. 7a}$$

$$p = \exp\left(\frac{n - .05n_1}{20}\right) \qquad \text{Eq. 7b}$$

$$.45 \cdot \sin(\omega_1 nT) + .55 \cdot A \cdot [\cos(\omega_3 nT + \phi_1) - \qquad \text{Eq. 8}$$

$$\sin(\omega_3 nT + \phi_1)] \qquad 1000 \leq n \leq 2000(=n_2)$$

$$.45 \cdot \sin(\omega_1 nT) + .55 \cdot [X(b_m, nT)\cos(\omega_3 nT + \phi_1) + \qquad \text{Eq. 9}$$

$$Y(b_m, nT)\sin(\omega_3 nT + \phi_1)] \qquad 2000 < n$$

In equations 7–9 $\omega_1$ is the 500 Hz reference frequency R, $\omega_2$ is the 1409 Hz high tone, and $\omega_3$ is the carrier frequency. In Eq. 7 the envelope function smoothes the onset of the signal so that the amplitude does not jump from zero to some value in one sample. Eqs. 7a and 7b show the parameters of the envelope function, where $n_1$ is the start DTMF length in number of samples, and the coefficients of $n_1$ and n chosen to suitably shape the envelope. Without a smoothing envelope, the quick onset would cause ringing in the system which could result in a longer detection time requirement for the initial DTMF. In Eq. 8, the phase $\phi_1$ is chosen so that at the transition $n_1$ (here at n=1000) there is no discontinuity in the generated waveform. Additionally, the amplitude A is chosen to match the peak of the data $X(b_m, nT)$ at $n_2$, at n=2000. Continuity across the boundaries is required to minimize high frequency components whose subsequent elimination, when the entire signal is passed through a bandwidth constrained transmission medium, would cause distortion.

The functions X and Y represent baud encoding 321 and (square root raised cosine) pulse filtering by filters 325. This is a well known operation described in the CCITT V.32 specification. For clock synchronization, as mentioned before, a baud pattern is sent. One example (pre-filtered) sequence of bauds (real data, imaginary data) is (+max,−max), (+max,−max), (−max,+max), (−max,+max), . . . (+max,−max). Ten to twenty alternating bauds are sent to ensure receiver clock synchronization.

The specific bandwidth allocation and carrier recovery scheme used by the modulator 315 is dependent on the communications protocol employed. The communications protocol described herein is but one protocol that can be used, and has been established to improve the performance of the modulator 315 and sound file receiver 129 given the typical conditions found in telecommunications lines, the limitations of the processing power and cost of microprocessors, and other related technological constraints. Other communications protocols using QAM can be employed with the present invention, with appropriate modifications to allow rapid recovery of the carrier and clock signals and synchronization of the systems. When used with the present invention, a communications protocol should allow the system to transmit the modulated data in bursts, or small packets. In addition, the communications protocol should provide sufficient bandwidth (bits per second) to transmit all forms of computer data including high resolution color graphics, or audio data.

Target Formatter

After the modulator 315 has produced the modulated data prompt 500, the data prompt 500 is provided to the target formatter 343 for equalization 345 and quantization 347. Where the frame formatter 307 and the modulator 315 produce a generally formatted signal that can be used with any variety of devices, the target formatter 343 is used to format the produced signals for the specific voice processing system 102 or other transmission device being used to transmit the data prompt 500. The modulated data can equalized and quantized and then stored for later transmission, or it can be immediately transmitted.

First, the target formatter 343 equalizes 345 the modulated signal. This is because QAM transmissions depend as much on amplitude variations as they do on frequency variations. In this discussion the non-ideal nature of the voice processing system 102 with respect to its frequency spectrum has been ignored. However, if the passband of the frequency transfer characteristic of the entire transmission system, from the voice is processing system 102 through the telephone network to the sound file receiver 129, is not flat, then distortions will result which will render the data indecipherable.

The effects of the voice processing system 102 and the telephone network 115 over which the modulated signals are transmitted, can be accounted for separately. The average frequency transfer characteristic of the telephone network 115 is well known, as is its appropriate equalization. Equalization 345 of the voice processing system 102 is, however, highly dependent on the specific characteristics of the voice processing system 102 with which the sound file creator 101 and sound file receiver 129 are used.

Generally, voice processing systems 102 may be rated on voice quality which, in turn, can be measured by the voice processing system's 102 spectral characteristics. Thus ideally a voice processing system 102 should have a very flat and very wide frequency transfer function. In practice, however, voice processing systems 102 from different manufacturers have very different characteristics. Typical voice processing systems 102, to which the present invention is adapted for use, are not specifically designed to have flat responses like computer modems, since they are not designed to transmit data for decoding, but only voice data, which has far less stringent equalization requirements.

While equalization 345 is necessary, it must be determined where it is appropriate to equalize which part of the system, at the transmitting end, the receiving end, or both. Since the screen telephone 135 should ideally work with every voice processing system 102, thereby providing the consumer with a more generalized communication device, the screen telephone 135 itself does not "know" a-priori which manufacturer's voice processing system 102 it will be connected to during any particular call. In that case, the screen telephone 135 must either have knowledge of each and every voice processing system 102 available, or each and every voice processing system 102 must be made to look identical to the receiver. As one of the goals for the design of the screen telephone 135 and its sound file receiver 129 is reduced complexity, the latter option is used in the preferred embodiment. Thus equalization 345 of the voice processing system 102 is performed by the target formatter 343.

In the preferred embodiment, equalization is handled as follows:

TABLE 1

| Portion of System to be Equalized | Percent Equalization at Sound File Creator | Percent Equalization at Sound File Receiver |
| --- | --- | --- |
| Telephone Network | 50 | 50 |
| Transmitting Sys. | 100 | 0 |
| Adaptive Equal. of fluctuations | 0 | 100 |

Design of an equalizer 345 for the voice processing system 102 is performed in two parts. First, a number of measurements are taken of the frequency transfer characteristics of the voice processing system 102, by transmitting in succession, a number of sound files. Each of these sound files contains a discrete number of non-harmonically related frequencies, preferably 8 maximum. The voice processing system 102 is configured to transmit a sound file until it receives a DTMF. At this point it switches automatically to transmitting the next sound file. It continues until all sound files are transmitted. The entire set of these sound files are then constructed to contain $2^n$ evenly spaced frequencies between about 200 and 3500 Hz, where n is preferably 5. More frequencies can be used, resulting in more precise measurements, and the use of $2^n$ frequencies affords the use of an inverse fast fourier transform (FFT) as opposed to the much more complex discrete fourier transform (DFT), to get the filter coefficients.

As a measurement device, a spectral analysis, using FFT averaging, is used by scanning each of the transmitted sound files for frequency content. Once this data has been collected it can be analyzed on a personal computer, or like data analysis device, and the appropriate equalization parameters determined, by creating an inverse FFT transform of the frequency response of the voice processing system. The coefficients of the transform are then used to provide the filter parameters. In the preferred embodiment, a separate software application is used to convert the raw frequency data into an appropriate fixed equalizer, which is then incorporated into the equalizer 345.

Some voice processing systems 102 do not have an analog output, but instead transmit a digital signal that is passed through a digital PBX and then out over either digital or analog telephone lines. Where there is an all digital transmission path, equalization of the voice processing system 102 is not necessary. Where the PBX converts the digital signal to analog, the PBX needs to be equalized, using the above process.

The target formatter 343 also quantizes 347 the modulated signal to make it compatible with the voice processing system's digital to analog conversion, converting the floating point representation into a fixed number of bits, typically 8 or 16; alternatively, the modulator 315 may perform all its calculations in a fixed representation, in which case the target formatter 343 need only convert the modulated signal to the fixed point format of the voice processing system 102. The quantizer 347 also includes the ability to compress the modulated signal into any format used by the voice processing system 102, for example, A-law (a CODEC format), µ-law, or ADPCM. Alternatively, the output of the modulator 315 can be quantized 347 and equalized 345.

The output of the target formatter 345 is then a sound file 349, which appears to the voice processing system 102 the same as the sound files used to store the voice prompts. Because the original data prompt 500 is stored as a sound file 349, the voice is processing system 102 is able to "play" the file in response to a caller's inputs in the very same way it would play a voice prompt. Thus very few changes need to be made to the voice processing system 102 to accommodate the use of the data prompts. Where the sound file 349 represents a static data prompt 401, it is stored on the mass storage device 113 for later retrieval. For these types of sound files 349, the voice processing application 103 contains a pointer to the sound file 349, and retrieves and transmits the file 349 in order to provide menus, forms, or the like, to the caller's screen telephone 135. Where the sound file represents a dynamic data prompt 403, or combination of a static and dynamic prompts 413, the sound file 349 is immediately transmitted out on the telephone line 115 like a normal voice prompt file in response to a caller's inputs.

Sound File Receiver

The sound file receiver 129 performs a number of tasks in receiving and decoding the signals sent by the voice processing system 102. These tasks include: detecting the start of data transmission, locking onto the carrier reference, matching carrier phase, synchronizing the clock, demodulating the data, decoding the data into display or print commands, and displaying or printing the appropriate text and graphics. The communications protocol described above, and employed by the sound file creator 101, allows the sound file receiver 129 to be of minimal complexity, reducing the cost of manufacture. Specifically, with the use of the communications protocol, the sound file receiver 129 can be implemented, in the preferred embodiment, in a single digital signal processor.

Figure 6:
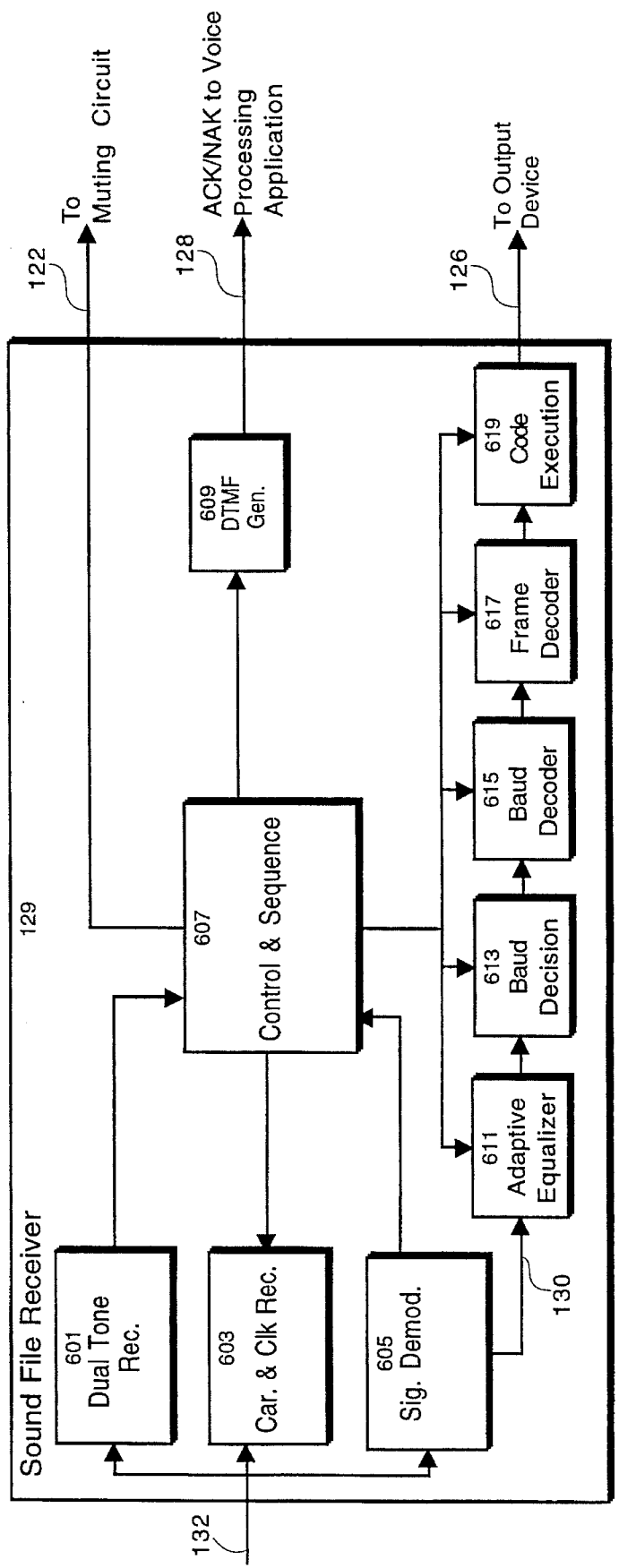
FIG. 6 is a block diagram of the sound file receiver.

Referring now to FIG. 6, there is shown the primary components of the sound file receiver 129. The sound file receiver 129 includes a dual tone detection block 601, carrier and clock recovery block 603, a signal demodulation block 605, a control and sequence block 607, and a number of processing blocks following signal demodulation. The control and sequence block manages the components of the sound file receiver 129, to control the detection, recovery, demodulation and processing of the input signal.

The sound file receiver 129 and associated components remain in the "off" or powered down state until the handset of the attached telephone 117 is taken "off-hook." Once off-hook, the control block 607 resets appropriate memory locations to receive a new prompt. When screen telephone 135 is not being used to communicate with a compatible voice processing system, the sound file receiver 129 and other components will remain in the "standby" state and not degrade the normal use of the telephone. While in the standby state the dual tone detection block 601 is continuously testing the input signal 132 for the DTMF 501 that indicates the beginning of a data prompt 500, using conventional DTMF detection algorithms, such as Goertzel's algorithm. When the tones are detected the control block 607 triggers the muting circuit 123 to mute the telephone handset 117. The control block 607 then signals the carrier and clock recovery block 603 to recover the reference and clock signals.

The carrier and clock recovery block 603 extracts the reference from the input signal 132, and multiplies it by the preset parameters n and m to recover the carrier and clock frequencies. The carrier and clock frequencies are used by the signal demodulation block 605 to extract the data from the signal. Once the data is extracted it is passed to the display, print, or other output and storage routines which execute the layer three protocol commands to output the data originally encoded for transmission by the user interface controller 301 to either the screen, the printer, or other device.

Carrier and Clock Recovery.

Figure 7:
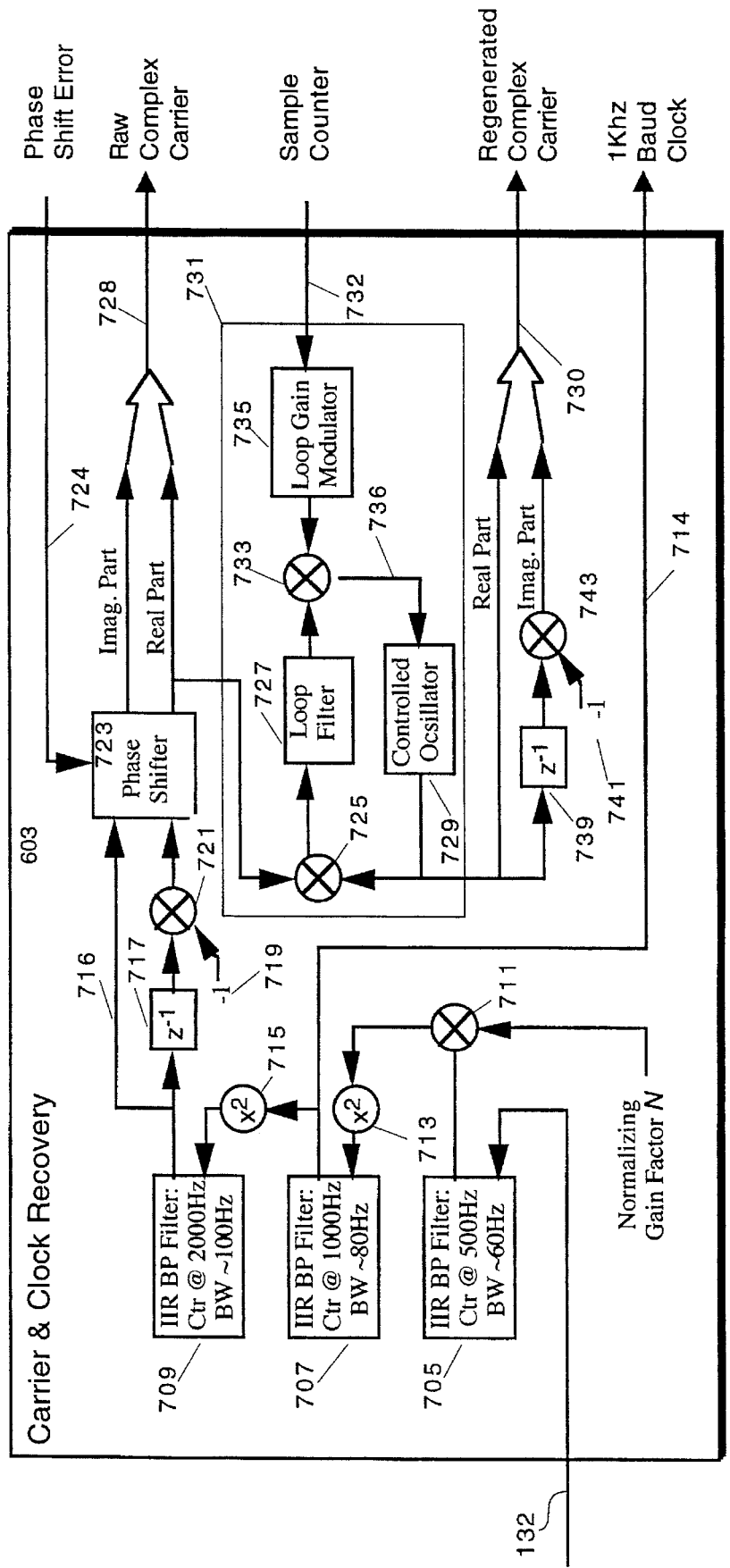
FIG. 7 is block diagram of the carrier and clock recovery section of the sound file receiver.

The detail of the carrier and clock recovery block 603 is shown in FIG. 7. This section begins with the recovery of the carrier frequency using a set of bandpass filters 705, 707, 709 and squarers 713, 715. Each combination of squarer and filter takes in a signal 132 of the form cos(x) and forms cos(2x) by squaring and removing the DC bias. If the input signal has an amplitude of other than unity, successive squaring will reduce the amplitude further. Filter 705 accepts the input signal 132 from the codec 133 and outputs the reference signal, which must be normalized to a fixed value, if the amplitude is less than unity. In the preferred embodiment, mathematical divisions are avoided by using the output from the dual tone detector 601 to provide an estimate of the signal amplitude. The control block 607 translates the amplitude of the 500 Hz reference portion of the input signal 132 (the value of which is a coincidental output of the Goertzel DTMF detection algorithm) with a lookup table into a normalizing gain factor N, which is input to the multiplier 711. The outputs of the carrier recovery filters 705–709 are the raw carrier C(716) and baud rate B(714) frequencies.

As was discussed earlier, the phase of the recovered carrier must be matched to that of the modulated data. In the preferred embodiment, phase is matched by initially demodulating the received data with the raw complex carrier 728, that is, before the carrier has been regenerated by the phase locked loop 731. This is done during the first part of the carrier sync portion 503 of the data prompt 500, the demodulator 605 receiving the raw complex carrier 728 as it is produced by the phase shifter 723. When the phase of the carrier is correct, the real part of the demodulated data output from the complex demodulator 803 (FIG. 8) will be equal in magnitude but opposite in sign to the imaginary part, that is Re()−Im()=0. Thus the difference, Re()−Im(), is generated 813 as an error signal 724 to the phase shifter 723 from the demodulator 605. The phase shifter 723 works using a simple trigonometric identity $$\cos(x-a)=\sin(a)\sin(x)+\cos(a)\cos(x) \qquad \text{Eq. 10}$$

The parameter a is updated by the error signal 724 until the error signal is bounded near zero for a fixed number of cycles, which in the preferred embodiment is 200 samples.

If the output of the carrier recovery section is cos(x), the sampled time equivalent to −sin(x) can be formed from cos(x) by performing a 90 degree phase shift (also known as Hilbert transforming). Since the preferred embodiment for use with a voice processing system 102 uses an 8000 Hz sample rate and the 2000 Hz carrier frequency is ¼ of the sample rate, the 90 degree phase shift is easily accomplished by inserting a one sample delay, indicated by the $z^{-1}$ block 717, and negation 719,721.

Once the carrier phase has been acquired the control and sequence block 607 switches 802 the demodulator 605 to receive the regenerated carrier 730 instead of the raw complex carrier 728.

The control block 607 constantly monitors the recovered reference frequency 716 to determine the end of the data prompt 500 by the loss of lock on the reference portion of the input signal 132. When the control block 607 detects the end of a data prompt 500 it checks the output of the frame decoder 617 for an end flag 513. If an end flag 513 was received, the control block 607 sends an acknowledge signal [ACK] to the voice processing system 102. If no end flag 513 was received, then a negative acknowledge [NAK] is returned back to the voice processing system 102. Both ACK and NAK are standard DTMF sequences. The voice processing system 102 is programmed such that it waits for an ACK or NAK each time a data prompt 500 is sent, as shown in FIG. 2. If an ACK is received, the voice processing system 102 continues on with its program to transmit the next voice prompt or data prompt 500, otherwise the current data prompt 500 is retransmitted.

Figure 11:
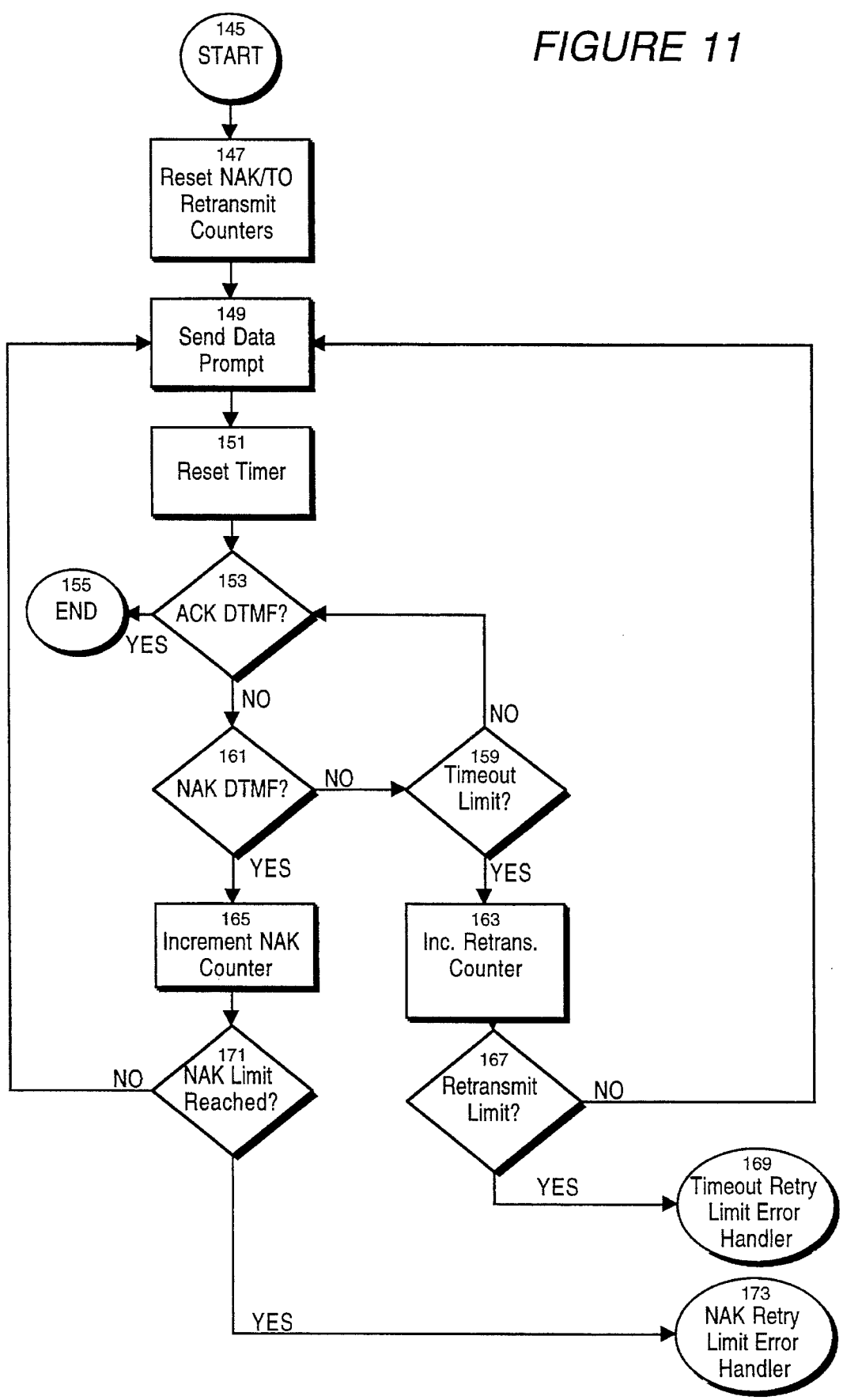
FIG. 11 is a flowchart of the transmission operation of the system 100.

Referring now to FIG. 11, there is shown a flowchart of the transmission operation of a system 102, during the transmission of a modulated data prompt 500 in a noisy of lossy telecommunication line 115, such as telephone lines, cable network, cellular system, fiber optics, or the like, where the probability of transmission error is relatively high. In these environments the system 102 must be able to recognize the negative acknowledgment, or lack thereof, in order to retransmit the data prompt. In non-noisy environments, such as direct digital connections, retransmission in not necessary.

A transmission is begun 145 by the system 102 in response to either a caller input, such as in a voice processing system 102, or by some other triggering fashion, such a user of the system 102 manually initiating transmission of a file or document. The system 102 resets 147 a pair of retransmit counters, a NAK retransmit counter for tracking the number of times the system 102 retransmits because of a received NAK signal, and a timeout counter for tracking the number of times the system 102 retransmits because neither a NAK or ACK was received within a preset time limit. The system 102 then sends 149 the data prompt 500, having either retrieved the data prompt 500 from the mass storage 113 or similar device, or having created it in real time from data retrieved from the mass storage 113 or computed. A timer is then reset 151, for limiting the amount of time the system 102 waits for a NAK/ACK signal before retransmitting.

The system 102 then checks 153 if a ACK signal has been received after the data prompt was sent. If so, the system 102 ends 155, the transmission being successful. Otherwise, the system 102 checks 161 if a NAK was received. If not, the system 102 determines 159 whether the timer has expired, indicating that neither a NAK or ACK has been received. If the timer has not yet expired, the system 102 continues to check for an ACK. If the timer has expired, then the timer retransmit counter is incremented 163. The system 102 checks 167 if retransmission limit has been reached. If not, then the system 102 will resend 149 the data prompt, otherwise, it will invoke 169 an error handling routine. Typically, if the system 102 reaches the timeout retransmission limit, then the receiving system either has a defective sound file receiver 129 or none at all.

If a NAK was received, then the NAK counter is incremented 165, and tested 171 to determine if the NAK retransmission limit was reached. If not, the system 102 then resends 149 the data prompt. If so, an NAK error handling routine is invoked 173. Typically, the system 102 will continue to received NAK's where there is a poor connection between the transmitting and receiving system 102, or a defective receiving system 102.

The Phase Locked Loop (PLL)

The PLL 731 is used to output the regenerated carrier frequency 730 for use in demodulating 605 the signal. The PLL 731 is designed to ensure that it can acquire the phase of the reference frequency very quickly with a minimum of noise. The PLL 731 of the preferred embodiment is able to lock onto the reference frequency in approximately 100 samples, or with the sample rate of 8 kHz, in about 1/80 sec. In the preferred embodiment of the PLL 731, a second order loop filter 729 is used with a transmission node (zero) at half the sample frequency. This is extremely useful since the carrier frequency is ¼ the sample frequency. The multiplication 725 of the input reference with the controlled oscillator 729 output (the multiplier 725 here used as a phase detector) then generates a large ½ sample frequency (4000 Hz) component which is then completely eliminated by the loop filter 727. This results in less noise and faster loop phase acquisition.

One significant problem in designing PLL loop filters is ensuring PLL stability. A conventional 2nd order Butterworth low pass filter, for example, cannot be used here because the phase shift through the filter will lead to PLL instability.

The phase transfer function of a conventional PLL that uses a voltage controlled oscillator (VCO) can be represented as $$H(s) = \frac{\Theta_1(s)}{\Theta_2(s)} = \frac{K \cdot F(s)}{s + K \cdot F(s)} \qquad \text{Eq. 11}$$

Here K is the overall loop gain and F(s) is the loop filter transfer function of loop filter 727. The additional s in the denominator is due to the integrating action of the VCO. In this derivation it is assumed that the PLL is in lock and the filtered error signal has reached a steady DC value. This conforms to expectations of the behavior of a hardware VCO where the frequency output of the VCO is different from the quiescent value only when the input is non zero (i.e. output frequency equals factor x error signal). In the preferred embodiment, where sound file receiver 129 is implemented in software on a signal processing chip, such as a digital signal processor, it is significantly easier to implement the oscillator 729 whose frequency is updated by the error signal 737, such that the new oscillator frequency $F_n$:

$$F_n = F_{n-1} + ce \qquad \text{Eq. 12}$$

where e is the error signal, and c is a factor value. This updating represents an additional integration in the phase locked loop since it is not the instantaneous value of the error signal which sets the frequency, but the current and all past values of the error signal. Thus Eq. 11 is modified to $$H(s) = \frac{\Theta_1(s)}{\Theta_2(s)} = \frac{K \cdot F(s)}{s^2 + K \cdot F(s)} \qquad \text{Eq. 13}$$

During initial experiments it was discovered that loop lock is achieved much faster when a second order loop filter transfer function F(s) is used for the loop filter 727. For stability the denominator of the above transfer function must have no poles within the unit circle in the s-plane. One way to do this is to postulate a denominator which looks like a stable system, such as a Butterworth or Chebychev filter. If F(s) has a denominator which is second order in s then the denominator of H(s) will be fourth order in s. Choosing the denominator to be Butterworth-like results in:

$$H(s) = \frac{K \cdot \frac{N(s)}{D(s)}}{s^2 + K \cdot \frac{N(s)}{D(s)}} = \qquad \text{Eq. 14}$$

$$\frac{\text{Numerator}}{s^2 \cdot D(s) + K \cdot N(s)} = \frac{\text{Numerator}}{s^4 + as^3 + bs^2 + as + 1}$$

where $$F(s) = \frac{N(s)}{D(s)} \qquad \text{Eq. 15}$$

Since F(s) should have the properties of a second order low pass filter the order of D(s) should be two and the order of N(s) should be less than two. Therefore let $$D(s) = d_0 + d_1 s + d_2 s^2 \qquad \text{Eq. 16}$$

$$N(s) = n_0 + n_1 s$$

Thus $$n_0 = 1/K \qquad n_1 = a/K \qquad \text{Eq. 17}$$
$$d_0 = bd_1 = a \qquad d_2 = 1$$

Now the substitutions Eq. 16 and 17 can be made into Eq. 15 giving $$K \cdot F(s) = \frac{1 + as}{1 + as + bs^2} \qquad \text{Eq. 18}$$

Given the objective of having a Butterworth-like denominator the values of a and b are not arbitrary. From standard 2nd order Butterworth filter tables a=2.731 and b=3.414. This function is then translated into the digital domain using the bilinear transformation and implemented as an IIR filter, resulting in loop filter 729.

The resulting PLL 731 is not guaranteed to be stable unless the value of K is judiciously chosen. While such instability would be extremely detrimental in a conventional modem, long term stability is not required by the sound file receiver 129. This is because the data prompts 500 used in this system are of finite length, unlike the continuous stream of data normally transmitted by conventional modem. Since the data prompts 500 are of such small duration (e.g. 10 seconds), the PLL 731 need not have long term stability, but need only be able to quickly lock onto the signal and remain stable enough for demodulation of the entire data prompt. If K is such that it is close to a value which gives stability, the PLL 731 will remain stable (locked) for a very long time after the initial phase lock even though it may eventually become unstable. This leads into the next topic of gain modulation.

With a large fixed value of the loop gain parameter the PLL 731 will acquire lock quickly but will be very sensitive to fluctuations in the input, having little noise immunity. Accordingly, it is preferable to begin with a high value of gain and decrease it to a low value. It was discovered that this should be done gradually so as to reduce the "shock" to the PLL 731. This shock is minimized when the spectral content of the gain step is reduced.

Accordingly, the PLL 731 operates in two stages, with the proper phase of the carrier recovered before the PLL 731 begins locking onto the reference frequency. Thus, the code for executing PLL 731 does not execute until the phase is acquired. When the phase is acquired, a sample counter 732 is zeroed by the control block 607, and then input into the loop gain modulator 735. The operation of the loop gain modulator 735 can be explained with reference to FIG. 10, which shows loop gain and filtered error (output of the loop filter 727). The control block 607 creates a signal (unfiltered gain) which is input to a narrowband (60 Hz) 2nd order Butterworth low pass filter (gain filter) for smoothing. The unfiltered gain signal is held at zero as is the filtered gain signal (output from the gain filter) by the control block 607 for a number of samples following the end of the start DTMF, shown in FIG. 10 between sample count 0 and 300. Gain filter delay elements are then loaded with values dependent on the actual implementation of the filter such that the output of the filter is 20–30% below its maximum output level (unity). The unfiltered gain signal is then held at unity for a number of samples, in this case between samples 300 to 400. During this time, the input to the filter is greater than the output, so the filter's output slowly ramps to unity. When the sample count exceeds a set limit, here sample 400, the input to the filter is decayed slowly over time, using a decay factor of about 0.997. Since the filter output will now asymptotically approach 0, a minimum gain value, such as 0.006, is added to the filter output.

As discussed, the phase locked loop 731 relies on an 8000 Hz sample rate, and can lock onto the carrier in about 1/80 of a second. With some adjustment, the same phase-locked loop design could be used for any reference recovery system at arbitrary sampling rates.

The Demodulator

Figure 8:
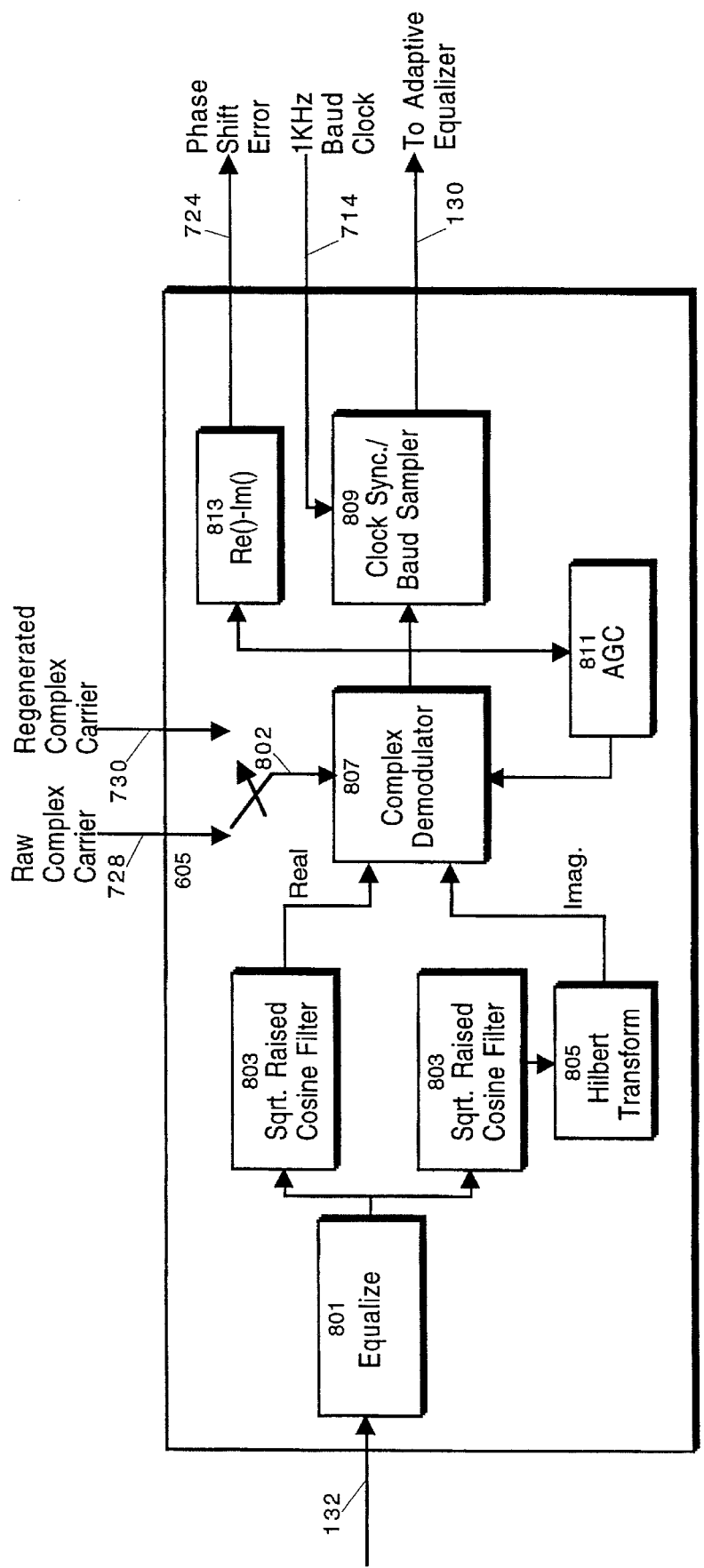
FIG. 8 is a block diagram of the signal demodulator of the sound file receiver.

As described above, the carrier and clock recovery block 603 produces both the raw complex carrier 728 and the regenerated complex carrier 730. Accordingly, demodulation of a QAM signal by the signal demodulator 605 switches 802 between the raw and regenerated carrier, in order to provide the fastest recovery and demodulation. The demodulator 605 also employs an initial automatic gain correction 811, and clock synchronization 809. The details of the demodulator 605 are shown in FIG. 8.

The complex demodulator 807 equalizes 801 the input signal 132, and filters 803 to recover the real and imaginary components, the imaginary component being the Hilbert transform 805 of the real component. These components are then demodulated using either the raw or regenerated carriers. A complex demodulator 807 demodulates the input signal 132 using the raw complex carrier 728 until the phase is acquired. The phase of the carrier is acquired about halfway through the carrier sync 503 portion of the data prompt 500. The complex demodulator 807 is then switched 802 by the control block 607 to demodulate with the regenerated complex carrier 730. This leaves the other half of the carrier sync 503 portion for the loop lock and automatic gain correction 811. Assuming that the phase of the PLL regenerated carrier 730 is correct, the output of the complex demodulator 807 will have real and imaginary parts roughly equal in amplitude but of opposite sign. During the carrier sync 503 portion, the voice processing system 102 sent a constant (modulated) signal amplitude that was equal to the real maximum or imaginary minimum baud level, i.e. an extrema of the signal constellation. During this period the AGC 811 accepts the demodulated input signal, and calculates an average magnitude equal to $[Re() - Im()]/2$. The signal gain is adjusted such that the average magnitude reaches 0.75, which is the correct value for the transmitted extrema. With the correct gain, the demodulated signal amplitude will correspond with what the baud decision block 613 expects to see for this baud. In a 16 level QAM constellation there are four extrema at the points (±0.75, ±0.75) (normalized to unity); if the output of the complex demodulator 807 is (0.5,−0.5) then the AGC 811 increases its gain until the output reaches (0.75,−0.75).

The clock synchronization block 809 determines the relationship between the recovered baud clock 714 and the output of the complex demodulator 807, particularly when the demodulator 807 output should be sampled. In the preferred embodiment this is done by squaring up the baud clock 714 and matching the zero-crossings between the clock and the (alternating baud) output from the complex demodulator 807 during the clock sync 505 portion of the data prompt 500 preamble. Preferably, the number of samples between a zero crossing on the clock and a zero crossing on the real part of the demodulator output are counted, averaging this value over several counts to reduce problems from edge jitter. Since a baud has a fixed number of samples in it (e.g. where the baud rate is 1000 Hz and the sample rate is 8000 Hz then there are 8 samples per baud) the number of samples from the baud edge to the baud center is also fixed. Thus when the relationship between the clock and baud edges are known the relationship between the clock edge and the baud center (sample point) is known.

The signal 130 output from the demodulator 605 is then passed to an adaptive equalizer 611 to counter the transfer characteristics of the telecommunications line 115. The baud decision block 613 determines the transmitted baud based on the real and imaginary components of the demodulated signal. The baud decoder 615 performs baud to binary translation specific to the number of QAM levels and bit coding scheme used, such as potential Trellis coding. The baud decoder 615 outputs binary data that contains the unmodulated data frame 515, as output by the frame formatter 307. A frame decoder 617 strips off the frame flags, and extracts the original computer instructions or data that were included in the data frame 515. This binary data is provided to a code execution block 619 for execution, passing the appropriate data and instructions to the screen display drivers 125 or the printer drivers 127 for outputting to either of these devices, or both, or to any other peripheral device, such as the memory 137 for storage of the data. In this manner the sound file receiver 129 can combine the binary data from a static data prompt 401 with a dynamic data prompt 403, by storing the output instructions of the former in the memory 137, and when a dynamic data prompt is subsequently received with instructions for displaying both the static and dynamic prompts, outputting the combined data prompt to a display or other device.

Figure 9:
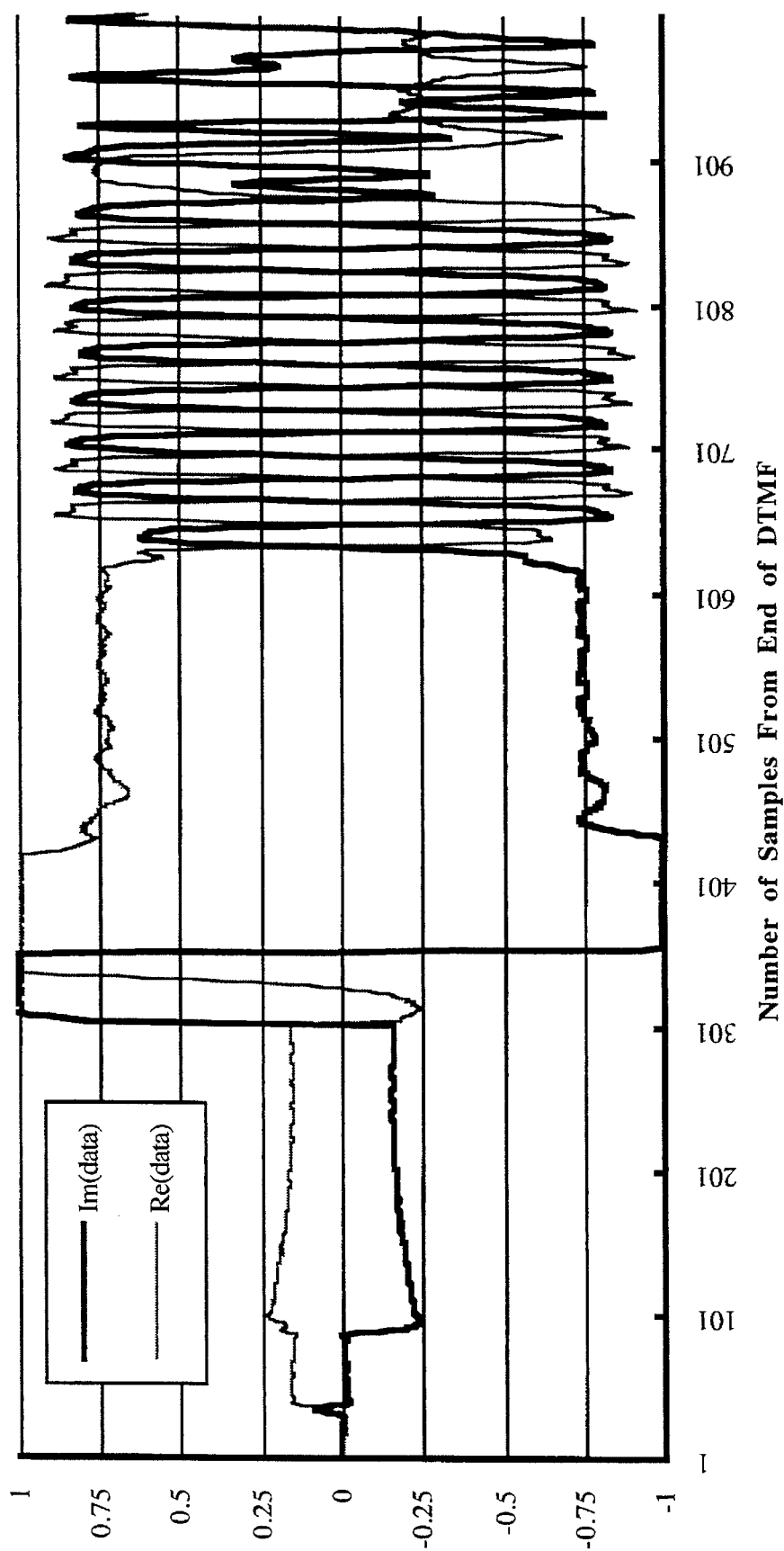
FIG. 9 is a plot of output of the complex demodulator after receiving a start DTMF.

Referring now to FIG. 9 there is shown an example of the output of the complex demodulator 807 following the start DTMF 501. In this example the baud rate B is 1000 Hz, and the remaining parameters are as described above. Between samples 1 and 650 the voice processing system 102 is sending constant data for the carrier sync 503 portion of the data prompt 500. Between samples 1 and 300 the clock and carrier recovery 603 block is recovering the carrier phase and providing the raw complex carrier 728 to the demodulator 605, which demodulates the data using the raw complex carrier 728. The proper phase of the carrier is acquired slightly after sample 100 where the Im() and Re() parts of the data have approximately the same amplitude, shown here as approximately ±0.25. The phase acquisition process is extremely rapid, occurring approximately between samples 80 and 110. Before sample 80 the signal is still settling from the abrupt transition from the 1409 Hz high tone to the 2000 Hz carrier. The conical shape of the plot after sample 100 is due to the settling of the narrow band carrier recovery filters. In the described embodiment, the AGC and PLL locking could begin as early as sample 150. Some care must be taken, however, to ensure that the maximum length of the ringing (here between samples 1 and 80) does not exceed that of the time allotted for phase recovery.

At sample 300 the demodulator 605 switches 802 from demodulating with the phase shifted raw complex carrier 728 to demodulating with the recovered complex carrier 730. The jumpiness of the plot between sample 300 and 500 is due to the AGC amplitude and PLL phase acquisition processes.

Figure 10:
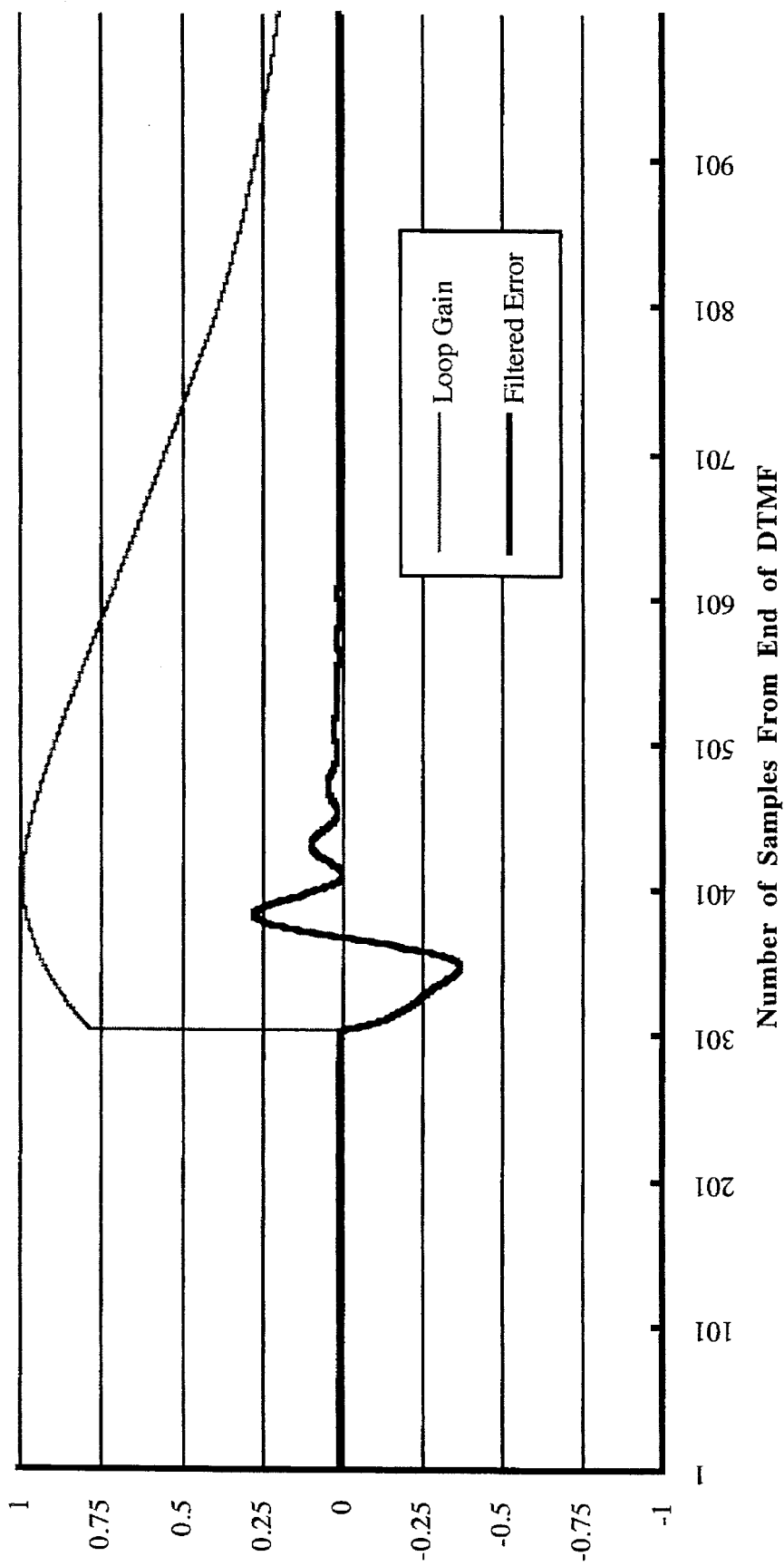
FIG. 10 is a plot of the filtered loop gain and filtered error signals of the phase lock loop section of the carrier and clock recovery section.

In FIG. 10 the filtered loop gain and filtered error signals are shown. The PLL error signal settles down around sample 500 showing that the PLL 731 has achieved phase lock. In FIG. 9 the Re() and Im() parts of the data have been placed at a normalized amplitude of ±0.75 by sample 500. This is in the center of the baud decision interval of 0.5 to 1.

In the preferred embodiment, the voice processing application 103 does not start transmitting the alternating bauds (clock sync) for another 150 samples. At sample 650 the data begins to oscillate in order to sync up the baud clock. In the preferred embodiment the voice processing application 103 sends two high bauds followed by two low bauds. If the voice processing application 103 were to send one high, one low, there would be a strong 500 Hz component in the data which would then interfere with clock recovery.

Figure 12:
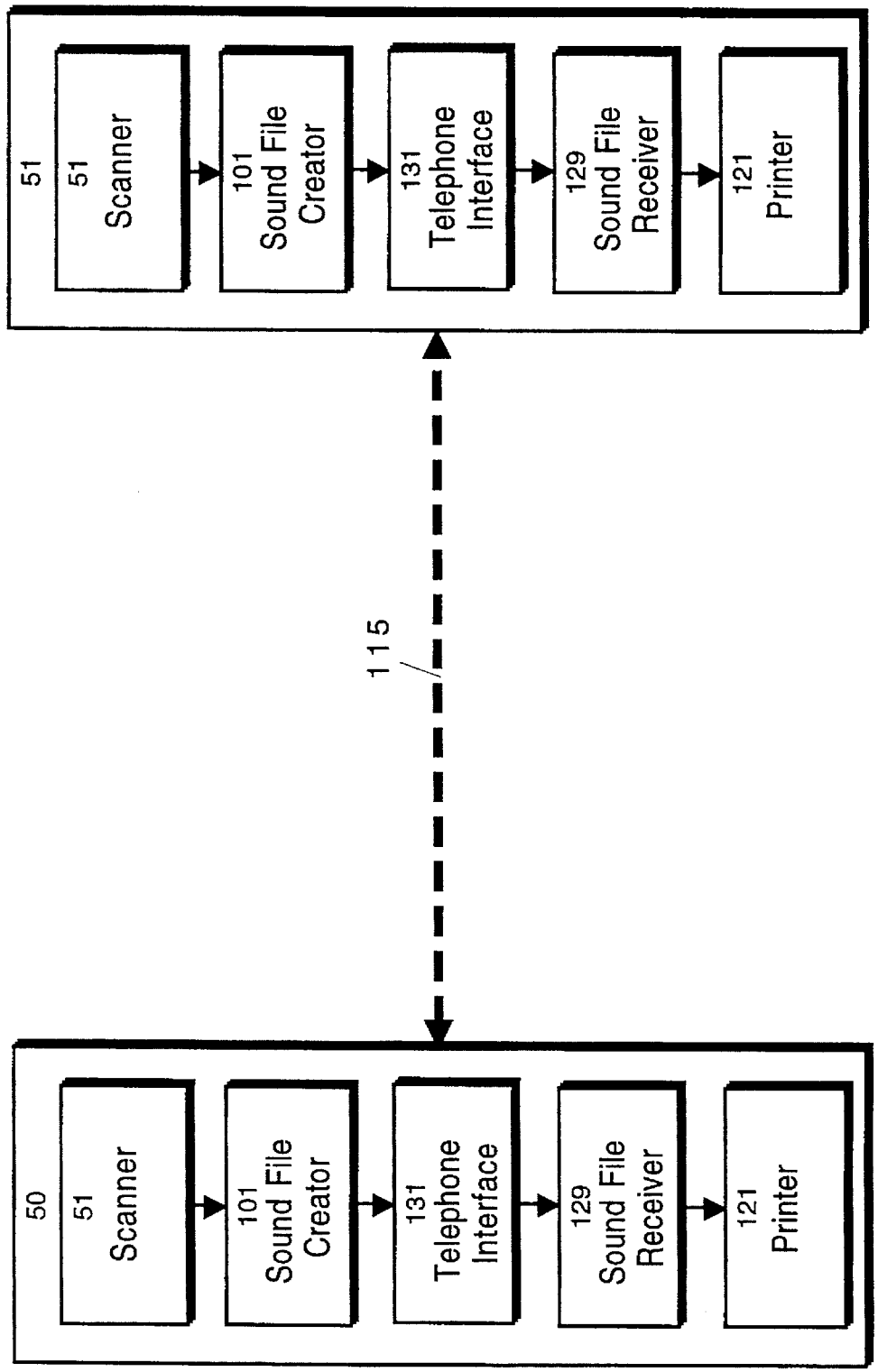
FIG. 12 is block diagram of an alternate embodiment of the invention.

The foregoing discussion has described the invention in one of its embodiments in a voice processing system 102 for use with screen telephones, in order to transmit and display information on such telephones, or to print information from an attached printer, or to store information in a memory unit. The communications protocol described herein is extensible to other embodiments, such as systems that are used only for transmitting graphic information or pixel data, without the need to transmit voice information or prompts. FIG. 12 shows another embodiment of the present invention. Here a sound file creator 101 and sound file receiver 129 are incorporated into facsimile-like devices 50 that scan 51 and digitize an input document containing printed data to produce pixel data representing the input document. The pixel data is then processed by a sound file creator 101 as described above, and transmitted over a telephone line 115 to a receiving facsimile device 50 having a sound file receiver 129 that demodulates the data, and prints 121 the input document. Thus the communications protocol can be used in a number of different devices to transmit any type of computer data. The use of time division multiplexing allows such data to be transmitted along with other types of data along a single communications line, but the data may also be transmitted independently of such other data types.

Figure 13:
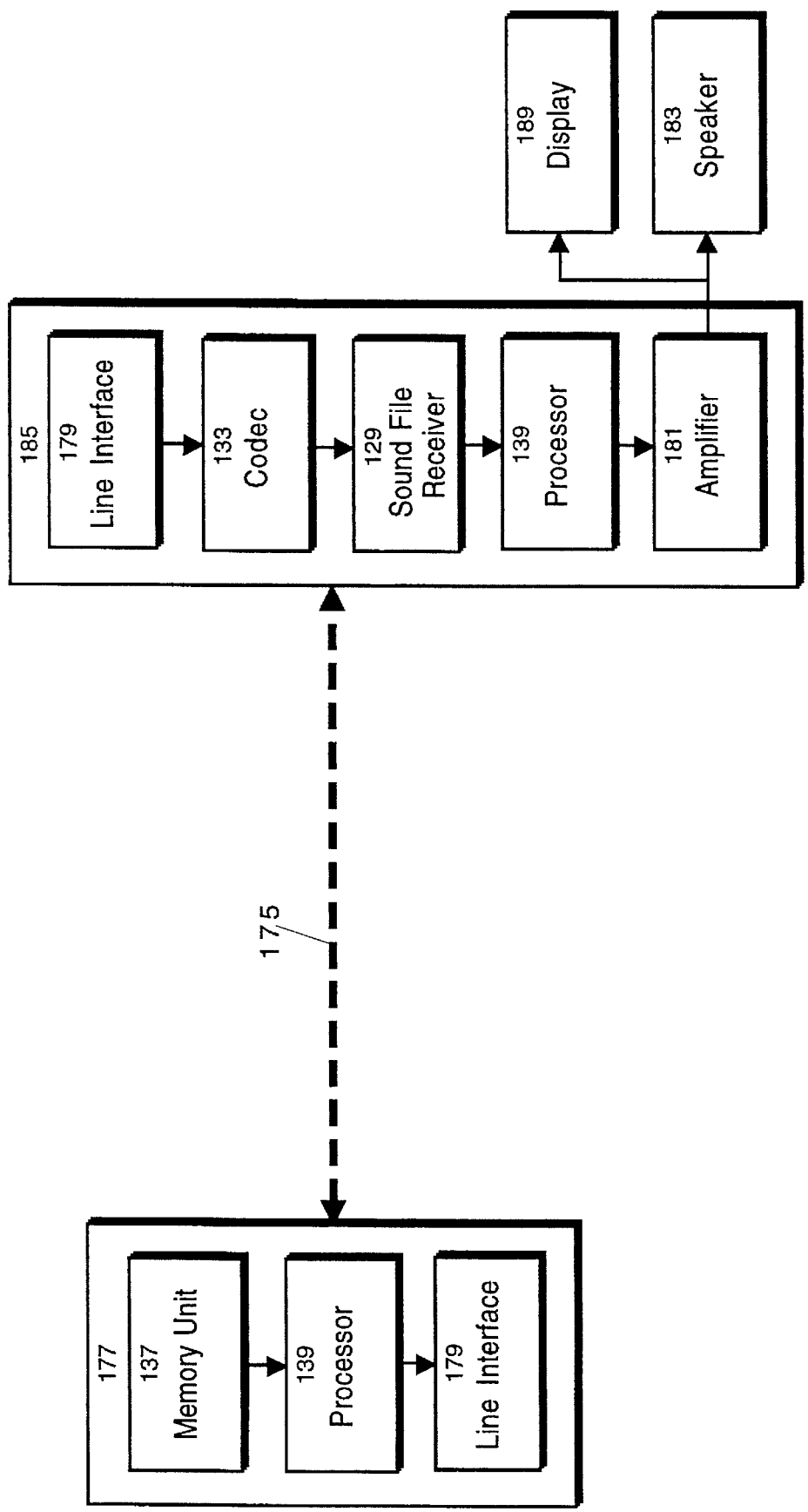
FIG. 13 is a block diagram of a further alternate embodiment of the invention.

FIG. 13 shows a further embodiment of the present invention. Here the invention is used with an apparatus 177 having a memory unit 137, such as a compact disc based storage, a PCMCIA card, or other memory device, containing data that has been modulated and stored. The data can include digitized music files, text, graphics, video, and the like. For example, in this embodiment, the apparatus may be a compact disk player, the memory unit 137 a compact disc containing modulated music files. The apparatus 177 has a line level interface 179 for connecting to similar line level device, such as conventional amplifiers, tape recorders, televisions, video cassette recorders, and the like, over a connection line 175. The processor 139 reads the modulated data from the memory unit 137 and outputs it over the connection line to a receiving device 185. The receiving device 185 includes a line interface 179 for coupling to the connection line 175, a codec 133 for converting the modulated data into digital data, and a sound file receiver 129 for demodulating the data into the data files, such as digital music files, or text, graphics, or computer instructions. A processor 139 determines whether the data is music or video data that needs to be converted to analog signals for amplification 181 and output, such as by a speaker 183, or a video display terminal 189. The processor 139 will also execute any instructions in the data, for example, to output text or graphic images to the display 189. Thus, if the memory unit 137 was a music compact disc, the processor 139 would send the demodulated data to the codec for conversion to analog signals, and then to the amplifier for amplification and output over the speakers.

Figure 14:
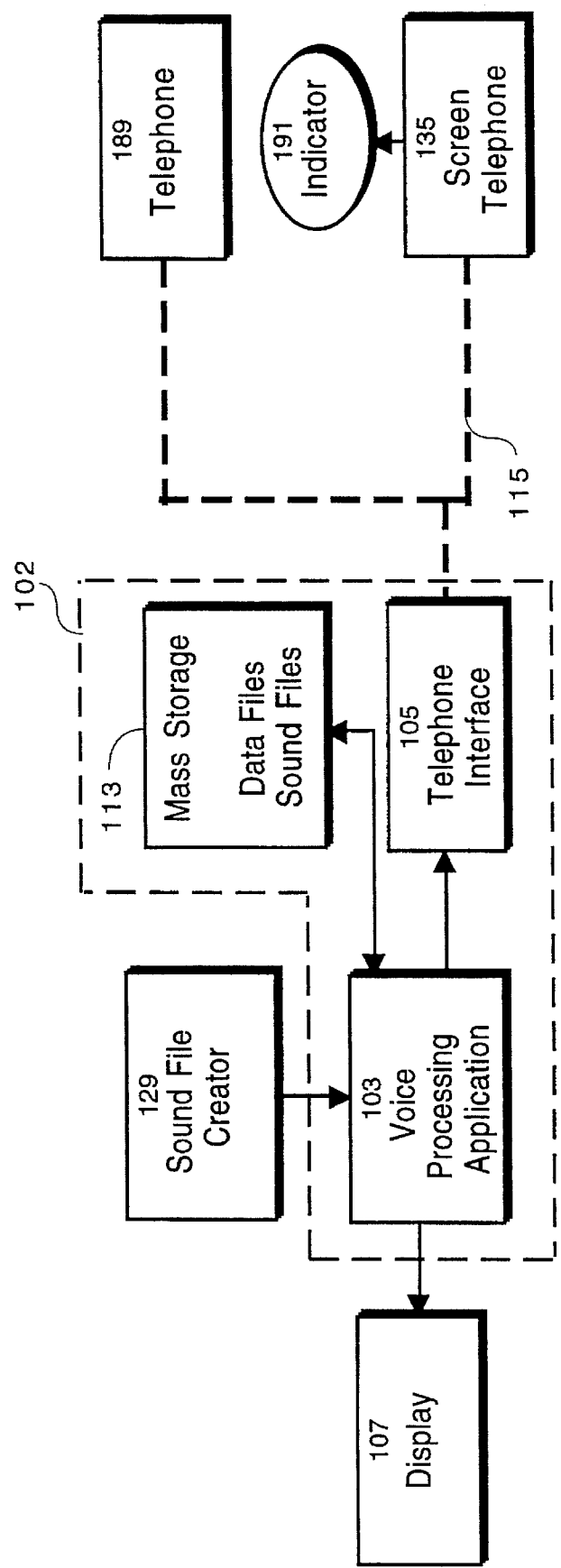
FIG. 14 is a block diagram of a further alternate embodiment of the invention.

A further alternative embodiment of the present invention is shown in FIG. 14. Here the sound file creator 129 is disposed in a voice processing system 102 designed to store and replay voice messages for subscribers to the system 102. A caller using a telephone 187, or similar device, calls a subscriber with a screen telephone 135, connecting to the screen telephone 135 though a communications line 115 that interfaces the voice processing system 102 between the caller's telephone 187 and the subscriber's screen telephone 135. If the screen telephone is not answered, then the caller may leave a recorded voice message for the subscriber, the voice processing system 102 prompting for, and recording the message. The voice processing system 102 stores the recorded message in the mass storage 113, using conventional storage and compression techniques. The voice processing system 102 then sends a data prompt, or other signal, to the screen telephone 135, indicating to the subscriber that a message has been received for the subscriber. The screen telephone, though in the on-hook state, is capable or receiving the data prompt or signal indicating the presence of the message. The data prompt can be a predefined signal that the screen telephone recognizes as indicating a message, in which case the screen telephone 135 retrieves from its memory unit 137 a screen display for display when the screen telephone 135 is put in the off-hook state. The data prompt may be a signal that triggers an indicator light 191 or similar device in the screen telephone 135 for indicating the presence, or number of, messages for the subscriber in the voice processing system 102. The subscriber can then access the voice processing system 102 with the screen telephone 135 to retrieve the stored message. In addition to signalling the presence of a message in the voice processing system 102 for the subscriber, the voice processing system 102 (or any other device including the sound file creator 129) can send an arbitrary signal, such as a data prompt, or other information to an on-hook screen telephone 135 (or other device including the sound file receiver 129). This allows any off hook device to provide automated messaging to remote on-hook devices.

I claim:

1. A receiver for receiving a modulated signal containing computer data, comprising:

a communications interface coupling the receiver to a communications line;

a signal recovery unit coupled to receive from the communications interface the modulated signal, the signal recovery unit recovering a first and second reference signals, each reference signal having a phase, the signal recovery unit including a phase shifter for adjusting the phase of the first reference signal; and a demodulator coupled to receive the modulated signal from the communications interface, and further coupled to receive the first reference signal from the signal recovery unit, the demodulator demodulating the modulated signal using the first reference signal, and producing a computer data signal having a real component and an imaginary component, the demodulator further including a phase comparator receiving the computer data signal and comparing the real and imaginary components thereof to determine a phase shift error signal, the phase comparator providing the phase shift error signal to the phase shifter, the phase shifter adjusting the phase of the first reference signal until the phase shift error signal reaches a predefined limit, the signal recovery unit producing the second reference signal having a same phase as the first reference signal, the demodulator receiving the second reference signal and demodulating the modulated signal with the second reference signal.

2. The receiver of claim 1, wherein the signal recovery unit further comprises:

at least one bandpass filter coupled to receive the modulated signal and recover the first reference signal; and a phase locked loop coupled to receive from the phase shifter the first reference signal, the phase lock loop locking onto first reference signal and establishing a phase corrected second reference signal, the phase locked loop further coupled to the demodulator to provide the phase corrected second reference signal, the demodulator switching from the phase adjusted first reference signal from the phase shifter to the phase corrected second reference signal in order to demodulate the modulated signal with the phase corrected second reference signal when the phase shift error signal reaches the predefined limit.

3. A method for demodulating a signal containing modulated data, comprising the steps of:

receiving the signal;

filtering the signal to recover a carrier reference having a phase;

demodulating the signal with the carrier reference to produce a phase shift error;

correcting the phase of the carrier reference according to the phase shift error, until a correct phase of the carrier reference is acquired; and demodulating the signal with the phase corrected carrier reference to produce the demodulated data.

* * * * *